(12) United States Patent  
Sridhar et al.

(10) Patent No.: US 8,071,241 B2
(45) Date of Patent: Dec. 6, 2011

(54) METHOD FOR THE CO-PRODUCTION OF HYDROGEN AND ELECTRICITY IN A HIGH TEMPERATURE ELECTROCHEMICAL SYSTEM

(75) Inventors: K. R. Sridhar, Los Gatos, CA (US); James F. McElroy, Suffield, CT (US); John E. Finn, Mountain View, CA (US); Fred Mitlitsky, Livermore, CA (US); Matthias Gottmann, Sunnyvale, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 360 days.

(21) Appl. No.: 12/230,486

(22) Filed: Aug. 29, 2008

(65) Prior Publication Data

US 2008/0318092 A1    Dec. 25, 2008

Related U.S. Application Data

(62) Division of application No. 10/446,704, filed on May 29, 2003, now Pat. No. 7,482,078.

(60) Provisional application No. 60/461,190, filed on Apr. 9, 2003.

(51) Int. Cl.
    *H01M 8/06* (2006.01)
(52) U.S. Cl. ........ 429/408; 429/411; 429/415; 429/417; 429/515
(58) Field of Classification Search .................. 429/408, 429/411, 415, 417, 418, 419, 443, 515, 472, 429/495; 205/343
    See application file for complete search history.

(56) References Cited

U.S. PATENT DOCUMENTS

| | | | |
|---|---|---|---|
| 3,488,266 A | 1/1970 | French | |
| 4,041,210 A | 8/1977 | Van Dine | |
| 4,182,795 A | 1/1980 | Baker et al. | |
| 4,532,192 A * | 7/1985 | Baker et al. | ................... 429/411 |
| 4,792,502 A | 12/1988 | Trocciola et al. | |
| 4,898,792 A | 2/1990 | Singh et al. | |
| 4,917,971 A | 4/1990 | Farooque | |
| 4,983,471 A | 1/1991 | Reichner et al. | |
| 5,034,287 A | 7/1991 | Kunz | |
| 5,047,299 A | 9/1991 | Shockling | |
| 5,084,362 A | 1/1992 | Farooque | |

(Continued)

FOREIGN PATENT DOCUMENTS

EP    1 233 467 A2 *    8/2002

(Continued)

OTHER PUBLICATIONS

U.S. Appl. No. 10/653,240, filed Sep. 3, 2003.*

(Continued)

*Primary Examiner* — Raymond Alejandro
(74) *Attorney, Agent, or Firm* — The Marbury Law Group PLLC

(57) ABSTRACT

A method in which a high temperature electrochemical system, such as a solid oxide fuel cell system, generates hydrogen and optionally electricity in a fuel cell mode. At least a part of the generated hydrogen is separated and stored or provided to a hydrogen using device. A solid oxide regenerative fuel cell system stores carbon dioxide in a fuel cell mode. The system generates a methane fuel in an electrolysis mode from the stored carbon dioxide and water by using a Sabatier subsystem. Alternatively, the system generates a hydrogen fuel in an electrolysis mode from water alone.

30 Claims, 13 Drawing Sheets

U.S. PATENT DOCUMENTS

| | | | |
|---|---|---|---|
| 5,143,800 | A | 9/1992 | George et al. |
| 5,169,730 | A | 12/1992 | Reichner et al. |
| 5,170,124 | A | 12/1992 | Blair et al. |
| 5,302,470 | A | 4/1994 | Okada et al. |
| 5,441,821 | A | 8/1995 | Merritt et al. |
| 5,498,487 | A | 3/1996 | Ruka et al. |
| 5,501,914 | A | 3/1996 | Satake et al. |
| 5,505,824 | A | 4/1996 | McElroy |
| 5,527,631 | A | 6/1996 | Singh et al. |
| 5,573,867 | A | 11/1996 | Zafred et al. |
| 5,601,937 | A | 2/1997 | Isenberg |
| 5,686,196 | A | 11/1997 | Singh et al. |
| 5,733,675 | A | 3/1998 | Dederer et al. |
| 5,741,605 | A | 4/1998 | Gillett et al. |
| 5,861,137 | A | 1/1999 | Edlund |
| 5,900,330 | A | 5/1999 | Kagatani |
| 5,955,039 | A * | 9/1999 | Dowdy ................. 422/189 |
| 5,997,594 | A | 12/1999 | Edlund et al. |
| 6,013,385 | A * | 1/2000 | DuBose |
| 6,033,794 | A | 3/2000 | George et al. |
| 6,051,125 | A * | 4/2000 | Pham et al. |
| 6,162,556 | A | 12/2000 | Vollmar et al. |
| 6,280,865 | B1 * | 8/2001 | Eisman et al. |
| 6,329,090 | B1 * | 12/2001 | McElroy et al. |
| 6,403,245 | B1 * | 6/2002 | Hunt |
| 6,436,562 | B1 * | 8/2002 | DuBose |
| 6,451,466 | B1 * | 9/2002 | Grasso et al. |
| 6,531,243 | B2 * | 3/2003 | Thom |
| 6,569,298 | B2 * | 5/2003 | Merida-Donis |
| 6,610,193 | B2 | 8/2003 | Schmitman |
| 6,623,880 | B1 * | 9/2003 | Geisbrecht et al. |
| 6,673,479 | B2 | 1/2004 | McArthur et al. |
| 6,821,663 | B2 * | 11/2004 | McElroy et al. |
| 6,892,840 | B2 | 5/2005 | Meaney |
| 7,014,932 | B2 | 3/2006 | Halter et al. |
| 7,201,979 | B2 | 4/2007 | McElroy et al. |
| 7,364,810 | B2 | 4/2008 | Sridhar et al. |
| 7,482,078 | B2 | 1/2009 | Sridhar |
| 2001/0010873 | A1 * | 8/2001 | Thom |
| 2001/0049035 | A1 | 12/2001 | Haltiner, Jr. et al. |
| 2002/0028362 | A1 | 3/2002 | Prediger et al. |
| 2002/0051898 | A1 | 5/2002 | Moulthrop, Jr. et al. |
| 2002/0058175 | A1 | 5/2002 | Ruhl |
| 2002/0106544 | A1 | 8/2002 | Noetzel et al. |
| 2002/0114984 | A1 | 8/2002 | Edlund et al. |
| 2002/0132144 | A1 | 9/2002 | McArthur et al. |
| 2002/0142208 | A1 | 10/2002 | Keefer et al. |
| 2003/0129459 | A1 | 7/2003 | Ovshinsky |
| 2003/0157386 | A1 | 8/2003 | Gottmann |
| 2003/0162067 | A1 * | 8/2003 | McElroy |
| 2003/0167105 | A1 | 9/2003 | Colborn |
| 2003/0196893 | A1 | 10/2003 | McElroy et al. |
| 2003/0205641 | A1 | 11/2003 | McElroy et al. |
| 2004/0013923 | A1 | 1/2004 | Molter et al. |
| 2004/0081859 | A1 | 4/2004 | McElroy et al. |
| 2004/0115489 | A1 * | 6/2004 | Goel .................... 429/13 |
| 2004/0137300 | A1 | 7/2004 | Gemmen et al. |
| 2004/0191597 | A1 | 9/2004 | McElroy |
| 2004/0191598 | A1 | 9/2004 | Gottmann |
| 2004/0224193 | A1 | 11/2004 | Mitlitsky et al. |
| 2005/0031918 | A1 | 2/2005 | Barber |
| 2005/0048334 | A1 | 3/2005 | Sridhar |

FOREIGN PATENT DOCUMENTS

| | | |
|---|---|---|
| WO | WO 00/69773 A1 * | 11/2000 |
| WO | WO 02/10877 A2 * | 2/2002 |
| WO | WO 02/37590 | 5/2002 |
| WO | WO 03/094320 A2 | 11/2003 |
| WO | WO 2004/025767 A2 * | 3/2004 |
| WO | WO 2004/049479 A2 * | 6/2004 |
| WO | WO2004093214 | 10/2004 |

OTHER PUBLICATIONS

"Low Cost Reversible Fuel Cell System," Proceedings of the 2000 U.S. DOE Hydrogen Program Review, Jun. 15, 2000, NREL/CP-570-28890.

"Low Cost, High Efficiency Reversible Fuel Cell (and Electrolyzer) Systems," Proceedings of the 2001 DOE Hydrogen Program Review NREL/CP-570-30535.

"Low Cost, High Efficiency Reversible Fuel Cell Systems," Proceedings of the 2002 U.S. DOE Hydrogen Program Review, NREL/CP-610-32405.

"Low Cost. Compact Solid Oxide Fuel Cell Generator," NASA Small Business Innovation Research Program.

"Small, Ultra Efficient Fuel Cell Systems," Advanced Technology Program ATP 2001 Competition (Jun. 2002).

Austin L.G., "Cell and Stack Construction: Low-Temperature Cells," NASA SP-120, 1967.

Jensen et al., "High Temperature Electrolysis of Steam and Carbon Dioxide," from Proceedings of Riso International Energy Conference, held at Riso National Laboratory, Denmark, May 19-21, 2003, Riso-R- 1405(CN), pp. 204-215, L.S. Peterson and H. Jensen, eds.

Mitlitsky, et al, "Regenerative Fuel Cells for High Altitude Long Endurance Solar Powered Aircraft," 28th Intersociety Energy Conversion Engineering Conference (IECEC), Jul. 28, 1993, UCRL-JC-113485.

Mitlitsky, et al, "Unitized Regenerative Fuel Cells for Solar Rechargeable Aircraft and Zero Emission Vehicles," 1994 Fuel Cell Seminar, Sep. 6, 1994, UCRL-JC-117130.

Office Action mailed Jun. 4, 2007 received in U.S. Appl. No. 10/653,240.

Office Action mailed Feb. 19, 2010 received in U.S. Appl. No. 12/005,344.

Office Action mailed Mar. 17, 2008 received in U.S. Appl. No. 10/866,238.

Office Action mailed Oct. 13, 2006 received in U.S. Appl. No. 10/866,238.

Supplementary European Search Report mailed Feb. 23, 1010, received in International Application No. PCT/US/2004010818. International Search Authority: Munich, Feb. 15, 2010.

Ledjeff, K et al., "Regenerative Fuel Cell for Energy Storage in PV Systems". Proceedings of the 26th Intersociety Energy Conversion Engineering Conference, vol. 3, Conf 26, Aug. 1991, pp. 538-541.

Office Action mailed Jan. 7, 2005 received in U.S. Appl. No. 10/446,704.

Office Action mailed Oct. 28, 2005 received in U.S. Appl. No. 10/446,704.

Office Action mailed Mar. 9, 2010 received in U.S. Appl. No. 11/717,774.

Office Action mailed May 5, 2010 received in U.S. Appl. No. 11/717,774.

Foreign Action mailed Mar. 23, 2010 other than Search Report received in EP 04 821 588.3-2119.

* cited by examiner

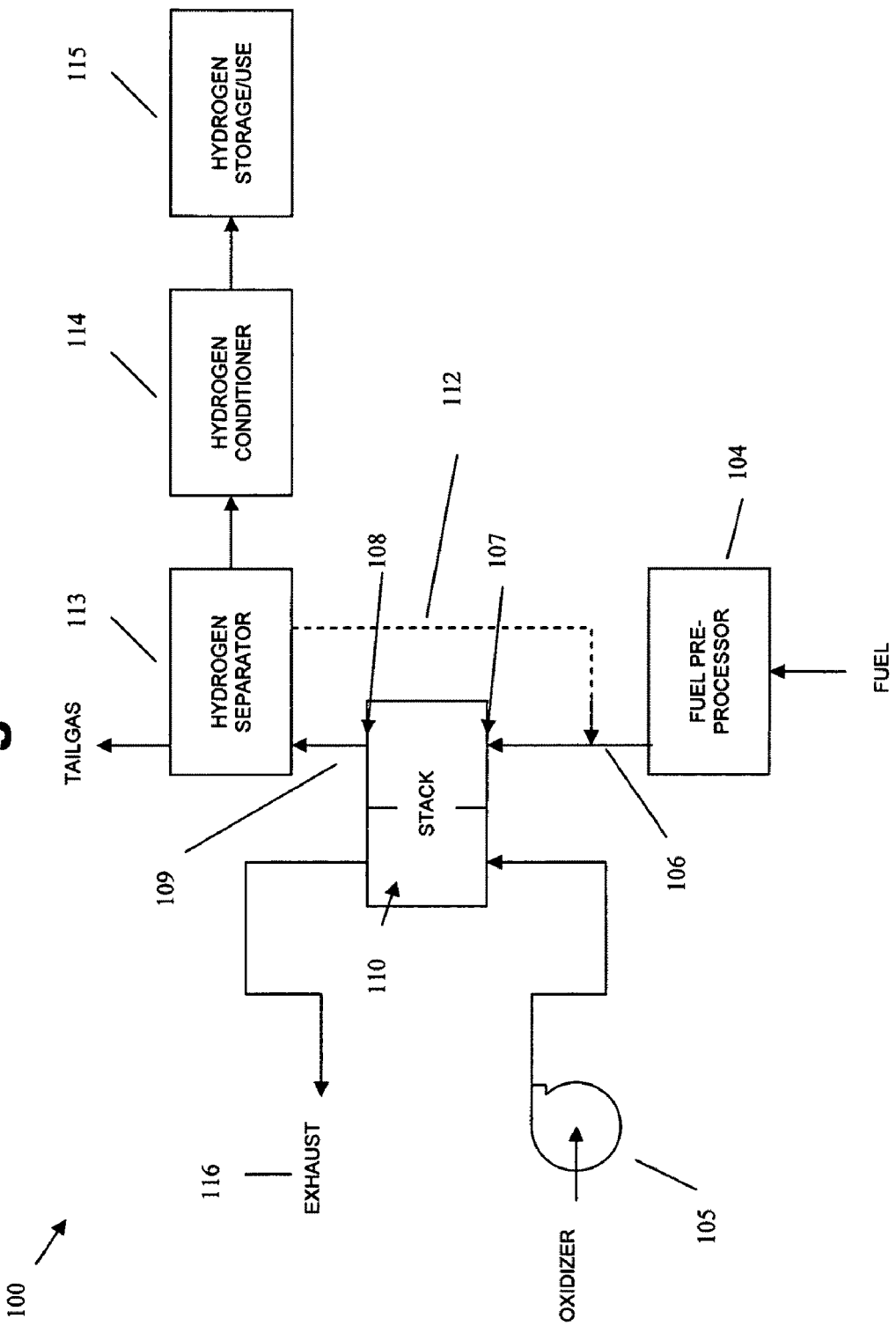

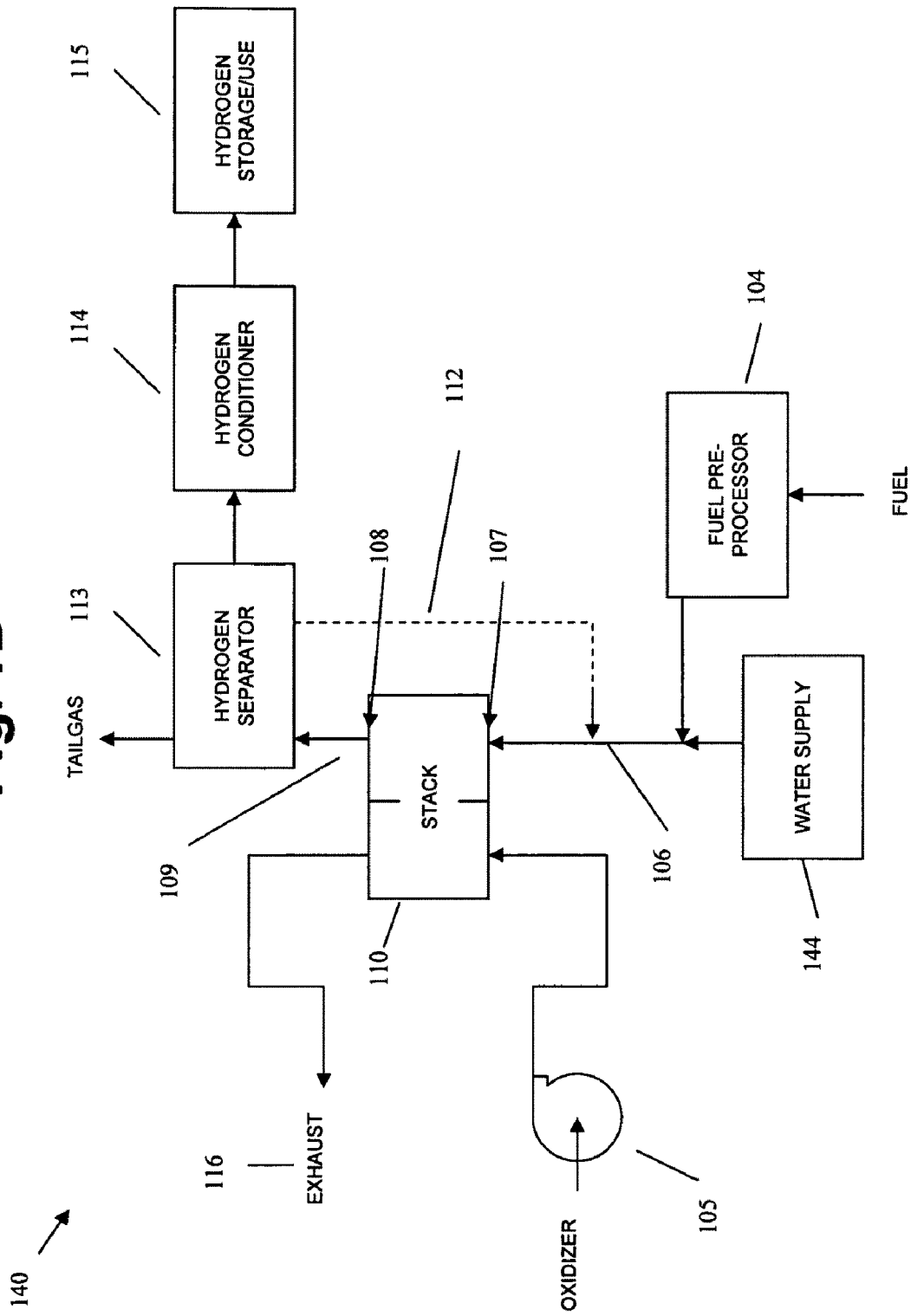

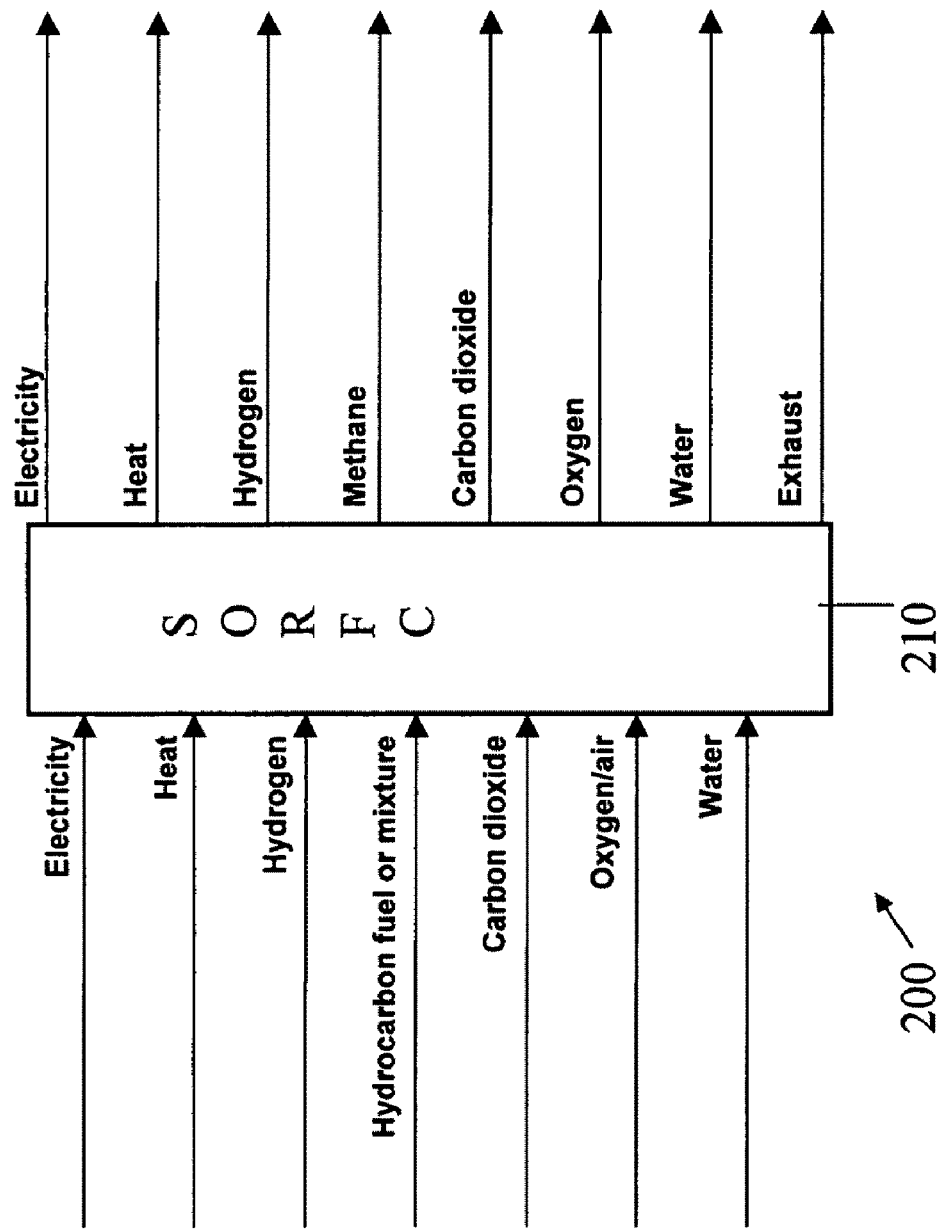

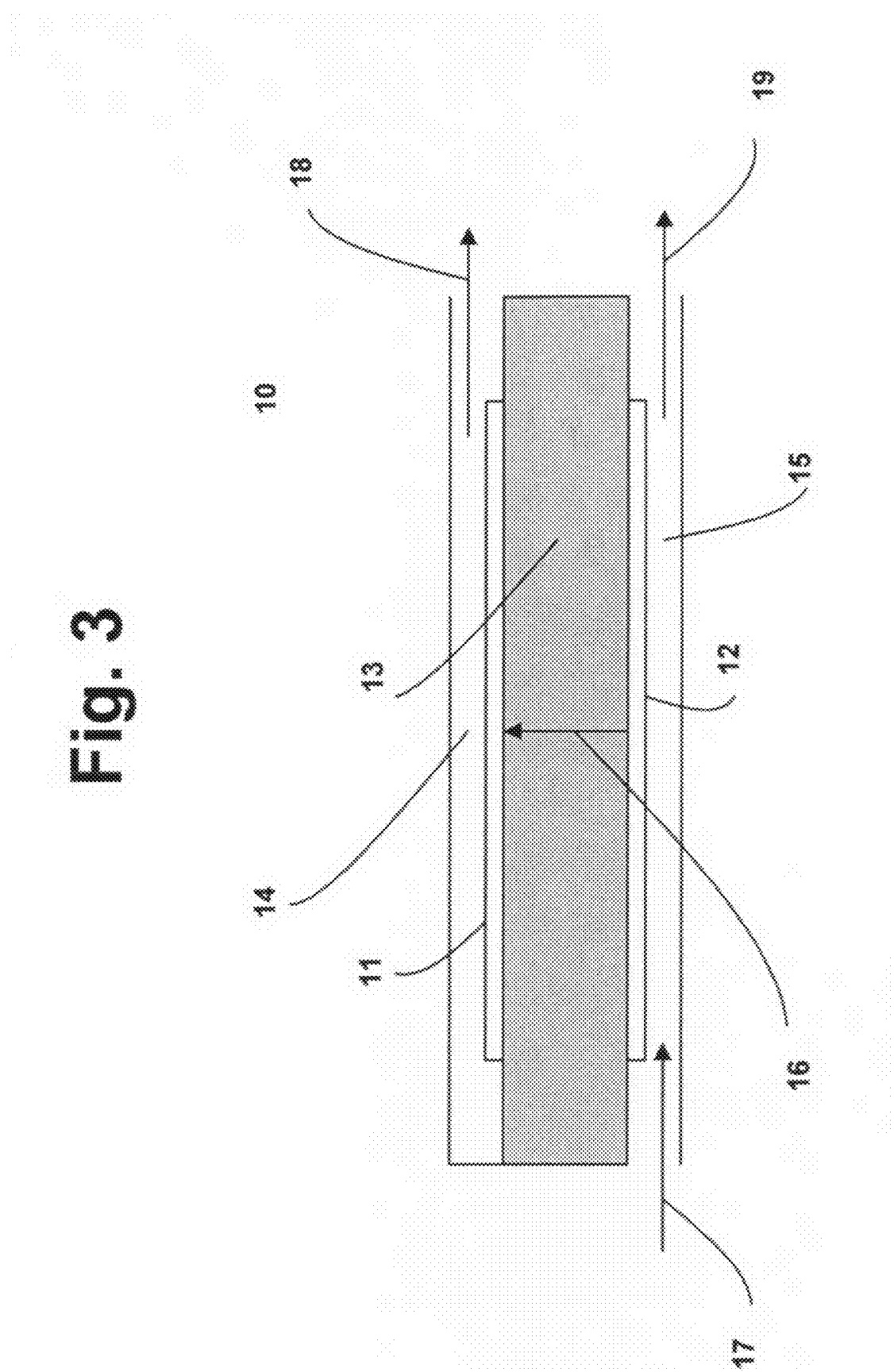

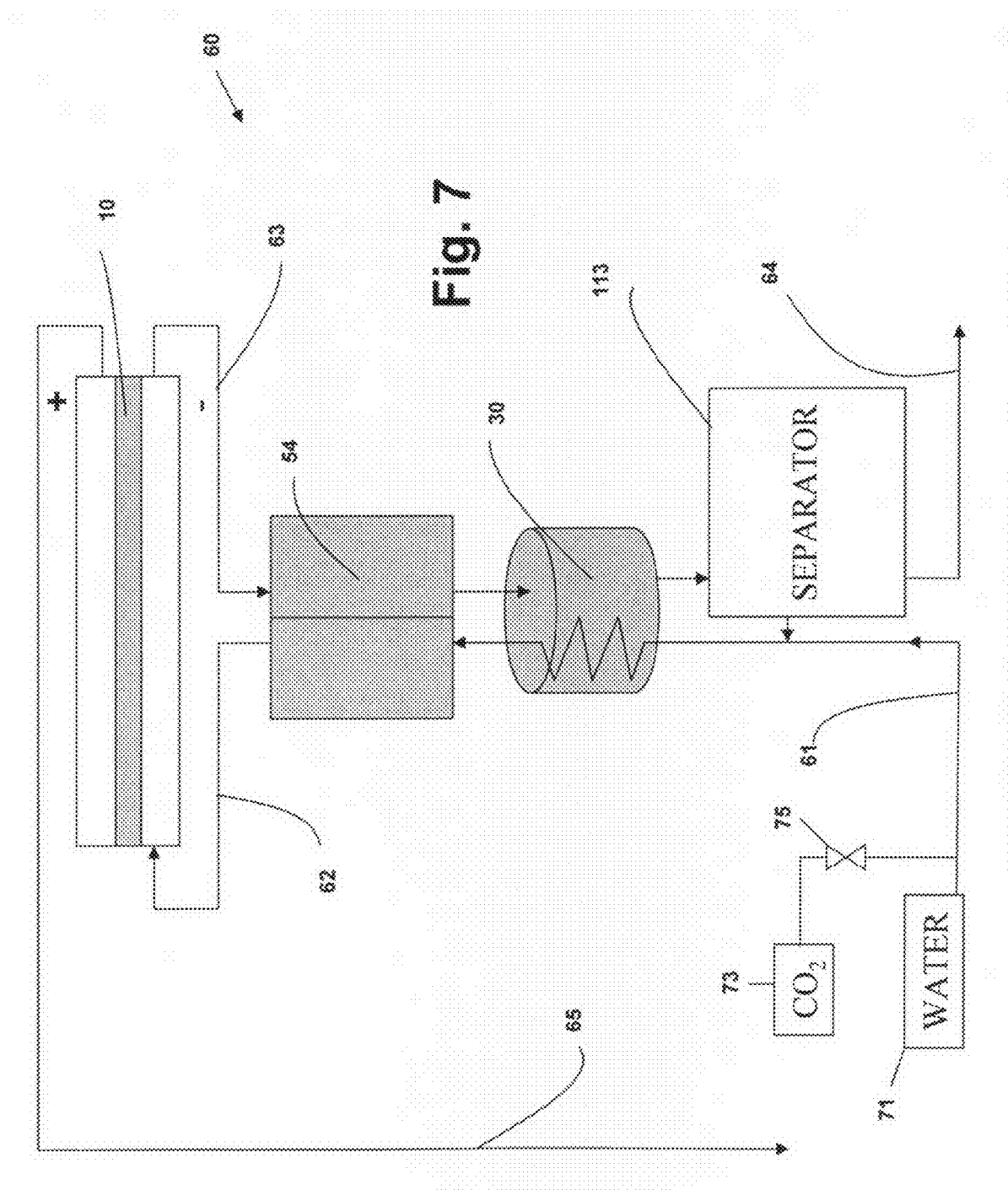

US 8,071,241 B2

METHOD FOR THE CO-PRODUCTION OF HYDROGEN AND ELECTRICITY IN A HIGH TEMPERATURE ELECTROCHEMICAL SYSTEM

This application is a divisional application of U.S. application Ser. No. 10/446,704, filed May 29, 2003, which issued as U.S. Pat. No. 7,482,078 on Jan. 27, 2009, which claims the benefit of priority of U.S. provisional application 60/461,190 filed on Apr. 9, 2003, which are incorporated by reference in their entirety.

FIELD OF THE INVENTION

The present invention is directed generally to electrochemical systems and more particularly to co-production of electricity and hydrogen in a high temperature fuel cell system.

BACKGROUND OF THE INVENTION

A solid oxide fuel cell (SOFC) is an electrochemical device that converts chemical energy directly into electrical energy. A solid oxide regenerative fuel cell (SORFC) is an electrochemical device that converts electrical energy directly into chemical energy and subsequently reconverts chemical energy back to electrical energy. This device differs significantly from rechargeable batteries in that the chemicals are stored outside of the SORFC converter. The SORFC system has many building electrical energy storage applications that cannot be satisfied by batteries. For example, a SORFC system for building power generation is discussed in the Proceedings of the 2001 DOE Hydrogen Program Review NREL/CP-570-30535. A SORFC system which generates hydrogen in the electrolysis mode and which generates electricity in the fuel cell mode is described in Proceedings of the 2002 DOE Hydrogen Program Review NREL/CP-610-32405. This SORFC system may contain a separate electrolyzer unit which operates in the electrolysis mode and which is operatively connected to the fuel cell stack to generate hydrogen. However, these SORFC systems have certain environmental and economic drawbacks.

The SOFC and SORFC are high temperature electrochemical systems. Another high temperature electrochemical system is a molten carbonate fuel cell. Fuel cells often use hydrogen as fuel. For example, fuel cell powered vehicles would require hydrogen refueling stations for operation. However, distribution of hydrogen from centralized hydrogen producing plants to refuel vehicles is not currently economical. Furthermore, hydrogen production is fairly expensive.

BRIEF SUMMARY OF THE INVENTION

A preferred embodiment of the present invention provides a high temperature electrochemical system, comprising a high temperature fuel cell, a carbon containing fuel source, and a hydrogen separator which is adapted to separate at least a portion of hydrogen from a fuel side exhaust stream while the fuel cell operates in a fuel cell mode. The system also comprises a hydrogen storage/use subsystem operatively connected to the hydrogen separator which is adapted to store at least a portion of hydrogen received from the hydrogen separator or a hydrogen storage/use subsystem operatively connected to the hydrogen separator which is adapted to provide at least a portion of hydrogen received from the hydrogen separator to a hydrogen using device.

Another preferred embodiment of the present invention provides a solid oxide electrochemical system, comprising a solid oxide fuel cell, a carbon containing fuel source, and a hydrogen separator which is adapted to separate at least a portion of hydrogen from a fuel side exhaust stream while the fuel cell generates electricity and operates in the fuel cell mode. The system also comprises a hydrogen storage/use subsystem operatively connected to the hydrogen separator which is adapted to store at least a portion of hydrogen received from the hydrogen separator or a hydrogen storage/use subsystem operatively connected to the hydrogen separator which is adapted to provide at least a portion of hydrogen received from the hydrogen separator to a hydrogen using device.

Another preferred embodiment of the present invention provides a high temperature fuel cell system, comprising a first means for generating a fuel side exhaust stream from a carbon containing fuel inlet stream and an oxidizer inlet stream by oxygen ion conduction, a second means for separating at least a portion of the hydrogen from the fuel side exhaust stream during generation of electricity by the first means, and a third means for storing at least a portion of the separated hydrogen or a third means for providing at least a portion of the separated hydrogen to a hydrogen using device.

Another preferred embodiment of the present invention provides a method of producing hydrogen, comprising providing a carbon containing fuel and an oxidizer into a high temperature fuel cell, generating a fuel side exhaust stream from the fuel cell while the fuel and the oxidizer are provided into the fuel cell operating in a fuel cell mode, separating at least a portion of hydrogen from the fuel side exhaust stream during the fuel cell mode, and providing at least a portion of the separated hydrogen to a hydrogen storage vessel or to a hydrogen using device.

Another preferred embodiment of the present invention provides a method of co-producing hydrogen and electricity, comprising providing a carbon containing fuel and an oxidizer into a solid oxide fuel cell, generating electricity and a fuel side exhaust stream from the fuel cell while the fuel and the oxidizer are provided into the fuel cell, separating at least a portion of hydrogen from the fuel side exhaust stream during generation of electricity, and providing at least a portion of the separated hydrogen to a hydrogen storage vessel or to a hydrogen using device.

BRIEF DESCRIPTION OF THE DRAWINGS

FIGS. 1A, 1B, 1C and 1D are system schematics of systems according to preferred aspects of the first preferred embodiment.

FIG. 2 is a schematic of inputs and outputs from a system according to the second preferred embodiment.

FIG. 3 is a schematic cross section of a single SORFC operating in the electrolysis mode according to a preferred embodiment of the present invention.

FIG. 7 is a system schematic of the major fuel cell system components operating in the electrolysis mode, according to a preferred embodiment of the present invention.

DETAILED DESCRIPTION OF THE PREFERRED EMBODIMENTS

The First Preferred Embodiment

Figure 1B:
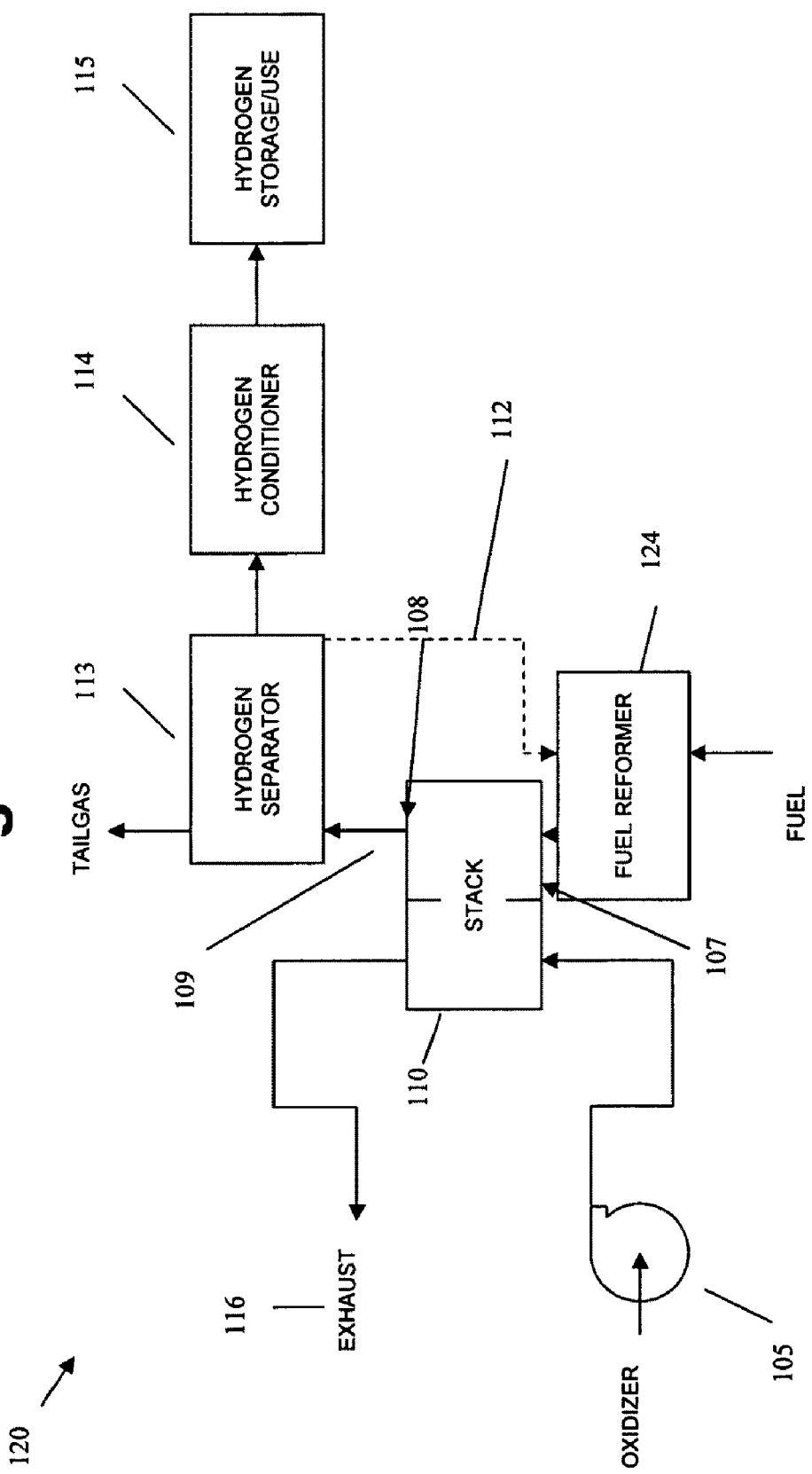

The present inventors have realized that a suitably configured high temperature electrochemical system, such as a solid oxide electrochemical system, such as a SOFC or a SORFC system, or a molten carbonate fuel cell system, can be used to co-produce hydrogen and electricity in the fuel cell mode. Thus, while the prior art SORFC system can generate either electricity in the fuel cell mode or hydrogen in an electrolysis mode, the system of the first preferred embodiment of the present invention can co-produce both hydrogen and electricity (i.e., produce hydrogen and electricity together). The system of the first preferred embodiment generates a hydrogen rich exhaust stream using reforming reactions that occur within the fuel cell stack and/or in a reformer in thermal integration with the fuel cell stack. The amount of hydrogen produced can be controlled by the operator. The hydrogen rich stream is further conditioned if necessary and stored or used directly by the operator. Thus, the high temperature electrochemical systems produce purified hydrogen as a by-product of fuel reformation in the fuel cell mode. The electrochemical system may operate in the fuel cell mode, when no external electricity input is required, to generate diffusion of ions across an electrolyte of the system. In contrast, a reversible or regenerative electrochemical system operates in the electrolysis mode when external electricity is required to generate diffusion of ions across the electrolyte of the system.

It should be noted that the electrochemical system of the first embodiment does not necessarily co-produce or co-generate power or electricity for use outside the system. The system may be operated to primarily internally reform a carbon and hydrogen containing fuel into hydrogen with minimal power generation or without delivering or outputting power from the system at all. If desired, a small amount of power may be generated and used internally within the system, such as to keep the system at operating temperature and to power system components in addition to other parasitic loads in the system.

The system of the first preferred embodiment which produces hydrogen in the fuel cell mode may be any high temperature electrochemical system which produces sufficient heat to free bound hydrogen contained in a fuel gas provided into the system. For example, the system may be a solid oxide or a molten carbonate system. The solid oxide system, such as a SOFC or SORFC is preferred. The following description of the preferred aspects of the present invention describes SOFC or SORFC systems. However, it should be noted that other suitable electrochemical systems may also be used.

Thus, in a preferred aspect of the first embodiment of the present invention, the high temperature electrochemical system is a SOFC or a SORFC system which co-produces electricity and hydrogen in the fuel cell mode. A SOFC or SORFC system operates in the fuel cell mode when oxygen ions diffuse through an electrolyte of the fuel cells from the oxidizer side to the fuel side of the fuel cell containing the carbon and hydrogen containing gas stream. Thus, when the high temperature electrochemical system, such as a SOFC or SORFC system operates in the fuel cell mode to generate hydrogen, a separate electrolyzer unit operating in electrolysis mode and which is operatively connected to the fuel cell stack is not required for generation of hydrogen. Instead, the hydrogen is separated directly from the fuel cell stack fuel side exhaust gas stream without using additional electricity to operate a separate electrolyzer unit.

When an SORFC system is used rather than an SOFC system, the SORFC system can be connected to a primary source of electricity (e.g., grid power) and can accept electricity from the primary source when desirable or can deliver electricity to the primary source when desirable. Thus, when operating the SORFC system of the first preferred embodiment, the system operator does not have to sacrifice electricity production to produce hydrogen and vice versa. The SORFC system does not require a hot thermal mass which absorbs heat in the fuel cell mode and which releases heat in the electrolysis mode for operation or energy storage. However, a hot thermal mass may be used if desired. Furthermore, the system may use, but does not require a fuel reformer.

Furthermore, in a preferred aspect of the first embodiment, a relative amount of hydrogen and electricity produced can be freely controlled. All or a portion of the hydrogen in the fuel side exhaust stream may be recirculated into the fuel inlet stream to provide control of the amount of electricity and hydrogen being co-produced in the system, as will be described in more detail below. The hydrogen product can be further conditioned, if necessary, and stored or used directly in a variety of applications, such as transportation, power generation, cooling, hydrogenation reactions, or semiconductor manufacture, either in a pressurized or a near ambient state.

FIG. 1A illustrates an SOFC or SORFC electricity generation system 100 according to the first preferred embodiment. The system derives power from the oxidation of a carbon and hydrogen containing fuel, such as a hydrocarbon fuel, such as methane, natural gas which contains methane with hydrogen and other gases, propane or other biogas, or a mixture of a carbon fuel, such as carbon monoxide, oxygenated carbon containing gas, such as methanol, or other carbon containing gas with a hydrogen containing gas, such as water vapor, $H_2$ gas or their mixtures. For example, the mixture may comprise syngas derived from coal or natural gas reformation. Free hydrogen is carried in several of the system process flow streams. The carbon containing fuel is provided into the system from a fuel source, which may comprise a fuel inlet into the fuel cell stack, a fuel supply conduit and/or a fuel storage vessel.

The system illustrated in FIG. 1A contains a fuel preprocessor subsystem 104, which may contain a heat exchanger and/or other fuel processing elements. In one preferred aspect of the present invention, the fuel preprocessor subsystem 104 converts a biogas, such as natural gas, to methane, and supplies methane into the fuel cell. The system 100 also contains an oxidizer inlet conduit 105, which preferably contains an air or other oxidizer blower (schematically shown in FIG. 1), and fuel inlet 106 and outlet 109 conduits. The system also contains a stack of SOFCs or SORFCs 110, which have a fuel inlet 107 and a fuel outlet 108. The stack 110 preferably contains the fuel cells, separator plates, seals, gas conduits, heaters, thermal insulation, control electronics and various other suitable elements used in fuel cell stacks. If desired, the system may have an optional oxidizer exhaust or outlet 116. Alternatively, the oxidizer outlet may be omitted to allow all oxygen to diffuse from the oxidizer inlet conduit 105 through the fuel cell electrolyte. The oxidizer inlet conduit 105 may also be used as an oxygen outlet when a SORFC is operated in the electrolysis mode. Water may be recirculated into the fuel inlet 107 from the fuel outlet 108, as will be described in more detail with respect to FIGS. 6A and 6B.

The system 100 also contains at least one hydrogen separator 113. The hydrogen separator 113 may comprise any device which can separate some or all hydrogen from a hydrogen containing gas stream. Preferably, the hydrogen separator is a device which can separate a desired or variable amount of hydrogen from a hydrogen gas containing stream, depending on user requirements. Alternatively, the hydrogen separator 113 may comprise a device which separates all or substantially all hydrogen from a hydrogen containing gas stream.

The hydrogen separator 113 may comprise one or more polymeric proton exchange membranes, ceramic proton exchange membranes, polymeric gas separation membranes, adsorption-based gas separation columns (such as pressure swing adsorption units), and flow diverting devices such as valves. The suitable device may be selected based on the state point of the gas stream (composition, temperature, and pressure), the desired product purity, available volume that depends on the specific generator design, and economic factors.

The system 100 also contains an optional hydrogen conditioner 114. The hydrogen conditioner 114 may be any suitable device which can purify, dry, compress (i.e., a compressor), or otherwise change the state point of the hydrogen-rich gas stream provided from the hydrogen separator 113. If desired, the hydrogen conditioner 114 may be omitted.

The system 100 also contains a hydrogen storage/use subsystem 115. This subsystem 115 may comprise a hydrogen storage vessel, such as a hydrogen storage tank, a hydrogen dispenser, such as a conduit which provides hydrogen or a hydrogen-rich stream to a device which uses hydrogen, or a hydrogen using device. For example, the subsystem 115 may comprise a conduit leading to a hydrogen using device or the hydrogen using device itself, used in transportation, power generation, cooling, hydrogenation reactions, or semiconductor manufacture.

For example, the system 100 may be located in a chemical or a semiconductor plant to provide primary or secondary (i.e., backup) power for the plant as well as hydrogen for use in hydrogenation (i.e., passivation of semiconductor device) or other chemical reactions which require hydrogen that are carried out in the plant.

Alternatively, the subsystem 115 may also comprise another fuel cell, such as an SOFC or SORFC or any other fuel cell, which uses hydrogen as a fuel. Thus, the hydrogen from the system 100 is provided as fuel to one or more additional fuel cells 115. For example, the system 100 may be located in a stationary location, such as a building or an area outside or below a building and is used to provide power to the building. The additional fuel cells 115 may be located in vehicles located in a garage or a parking area adjacent to the stationary location. In this case, the carbon and hydrogen containing fuel is provided to the system 100 to generate electricity for the building and to generate hydrogen which is provided as fuel to the fuel cell 115 powered vehicles. The generated hydrogen may be stored temporarily in a storage vessel and then provided from the storage vessel to the vehicle fuel cells 115 on demand (analogous to a gas station) or the generated hydrogen may be provided directly from the system 100 to the vehicle fuel cells 115.

In one preferred aspect of the present invention, the hydrogen separator 113 is used to separate and route hydrogen from the fuel side exhaust stream only into the subsystem 115. In another preferred aspect of the present invention, the hydrogen separator 113 is used to separate hydrogen from the fuel side exhaust stream and to route all or a part of the hydrogen back into the fuel inlet 107 of the fuel cell stack 110 through conduit 112, to route all or part of the hydrogen to the subsystem 115 and/or to route the hydrogen out with the tail gas.

Figure 6A:
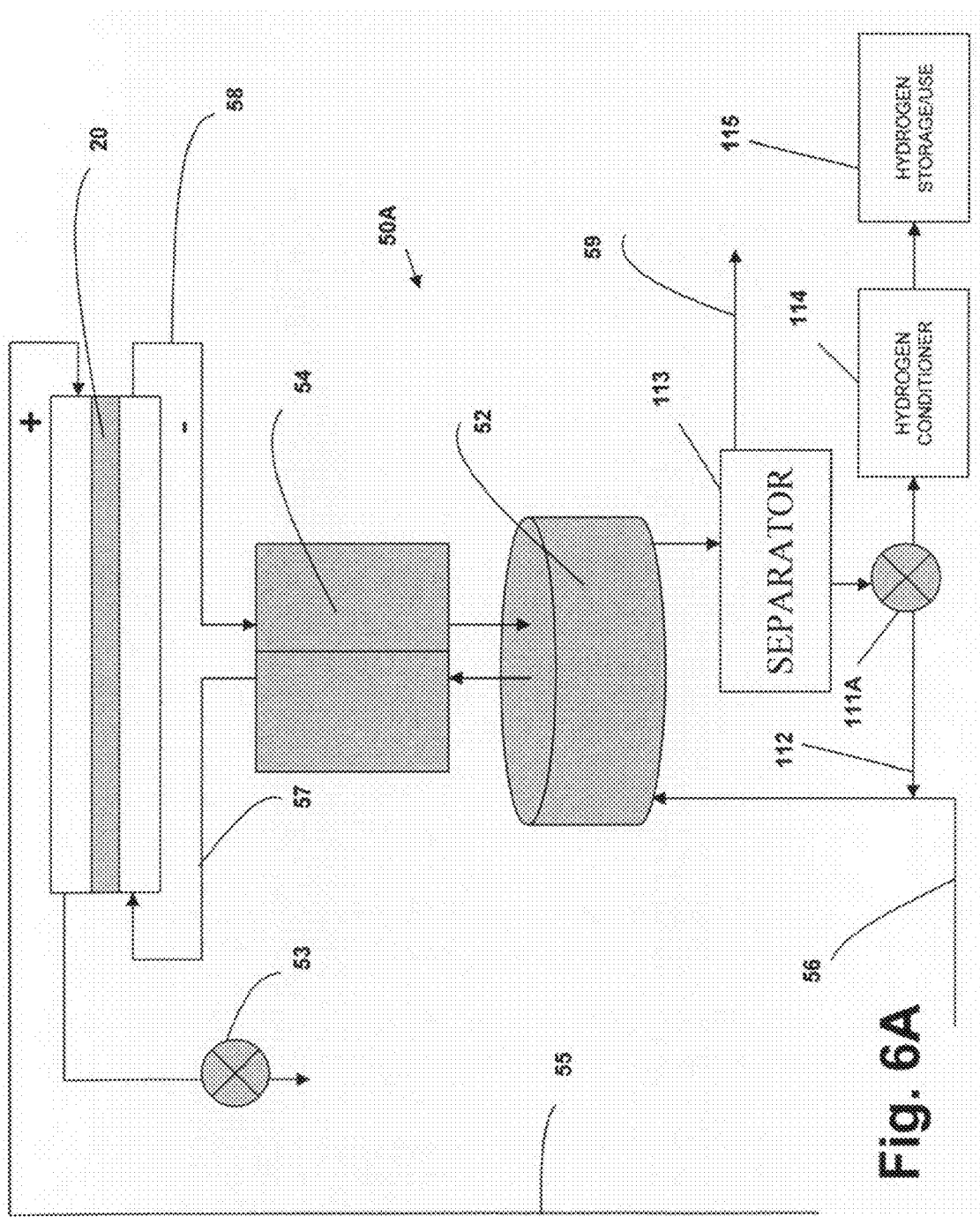
FIGS. 6A and 6B are system schematics of the major fuel cell system components operating in the fuel cell mode, according to a preferred embodiment of the present invention.
Figure 6B:
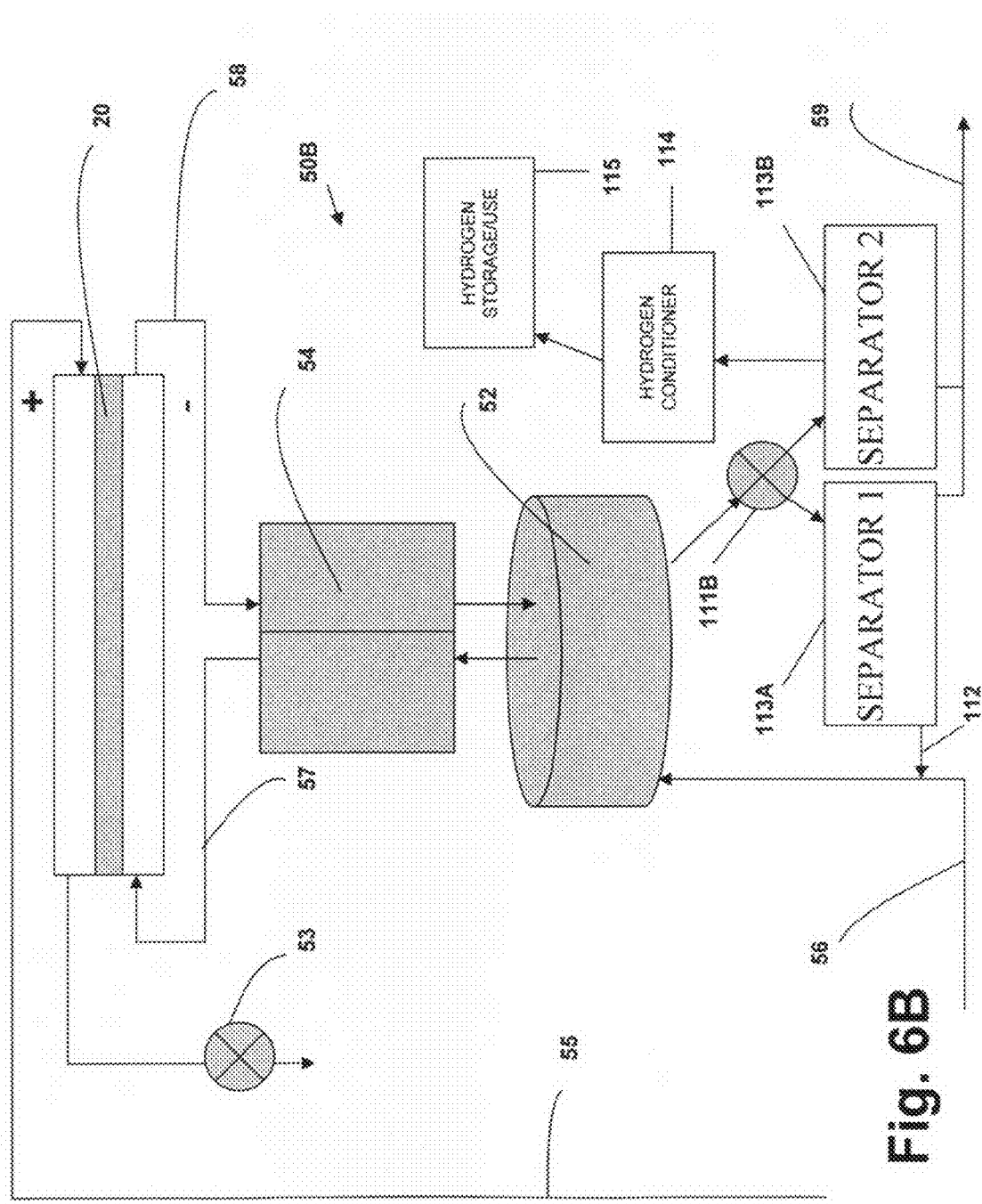

Alternatively, two different hydrogen separators may be used to route the hydrogen to the conduit 112 and to the subsystem 115, as shown in FIG. 6B and described in more detail below. Thus, the fuel side exhaust is separated by a valve or another device to two different hydrogen separators. The first hydrogen separator separates hydrogen from the first part of the fuel side exhaust and routes the hydrogen to conduit 112 to be recirculated into the inlet 107. The second hydrogen separator separates hydrogen from the second part of the fuel side exhaust and routes the hydrogen to the subsystem 115. Thus, the amount of hydrogen provided to conduit 112 and to subsystem 115 may be varied by controlling the amount of fuel side exhaust provided into each hydrogen separator.

Alternatively, only one hydrogen separator 113 is used. A valve or another device separates the hydrogen output from the separator into conduit 112 and into subsystem 115. Thus, the valve or another such device determines the amount of hydrogen provided to conduit 112 and subsystem 115. In both cases the valve or similar device may be controlled by an operator or controlled automatically by a computer based on predetermined data or on input parameters.

FIG. 1B illustrates a system 120 according to an alternative aspect of the first preferred embodiment. The system 120 is identical to the system 100 illustrated in FIG. 1A, except that the system 120 contains a fuel reformer 124 upstream of the fuel inlet 107. Preferably, the fuel reformer is included in the system 120 instead of the fuel preprocessing subsystem 104. However, if desired, the fuel reformer 124 may be used together with the fuel preprocessing subsystem 104, such that the output of the subsystem 104 is provided into the reformer.

The fuel reformer 124 may be any suitable device which is capable of reforming a carbon and bound hydrogen containing fuel to form a carbon containing fuel and free hydrogen. For example, the fuel reformer 124 may be any suitable device which can reform a hydrocarbon gas into a gas mixture of free hydrogen and a carbon containing gas. For example, the fuel reformer 124 may reform a biogas, such as natural gas to form free hydrogen and carbon monoxide. The free hydrogen and carbon monoxide are then provided into the fuel inlet 107 of the fuel cell stack 110. If desired, some or all free hydrogen may also be separated from the carbon containing gas by an additional hydrogen separator prior to entry into the fuel cell stack 110 and provided to the hydrogen storage/use subsystem 115.

In a preferred aspect of the first embodiment, the fuel reformer 124 is thermally integrated with the fuel cell stack 110. The term "thermally integrated" in this context means that the heat from the reaction in the fuel cell stack 110 drives the net endothermic fuel reformation in the fuel reformer 124. The fuel reformer 124 may be thermally integrated with the fuel cell stack 110 by placing the reformer 124 and stack 110 in physical and thermal contact with each other, or by providing a thermal conduit or thermally conductive material which connects the stack 110 to the reformer 124. While less preferred, a separate heater may also be used to heat the reformer 124 instead of or in addition to the heat provided from the stack 110. If any hydrogen is recycled from the separator 113 back into the fuel cell stack 110, then the hydrogen may be provided by the conduit 112 directly into the reformer 124 or into the fuel cell stack 110 inlet 107.

Figure 1C:
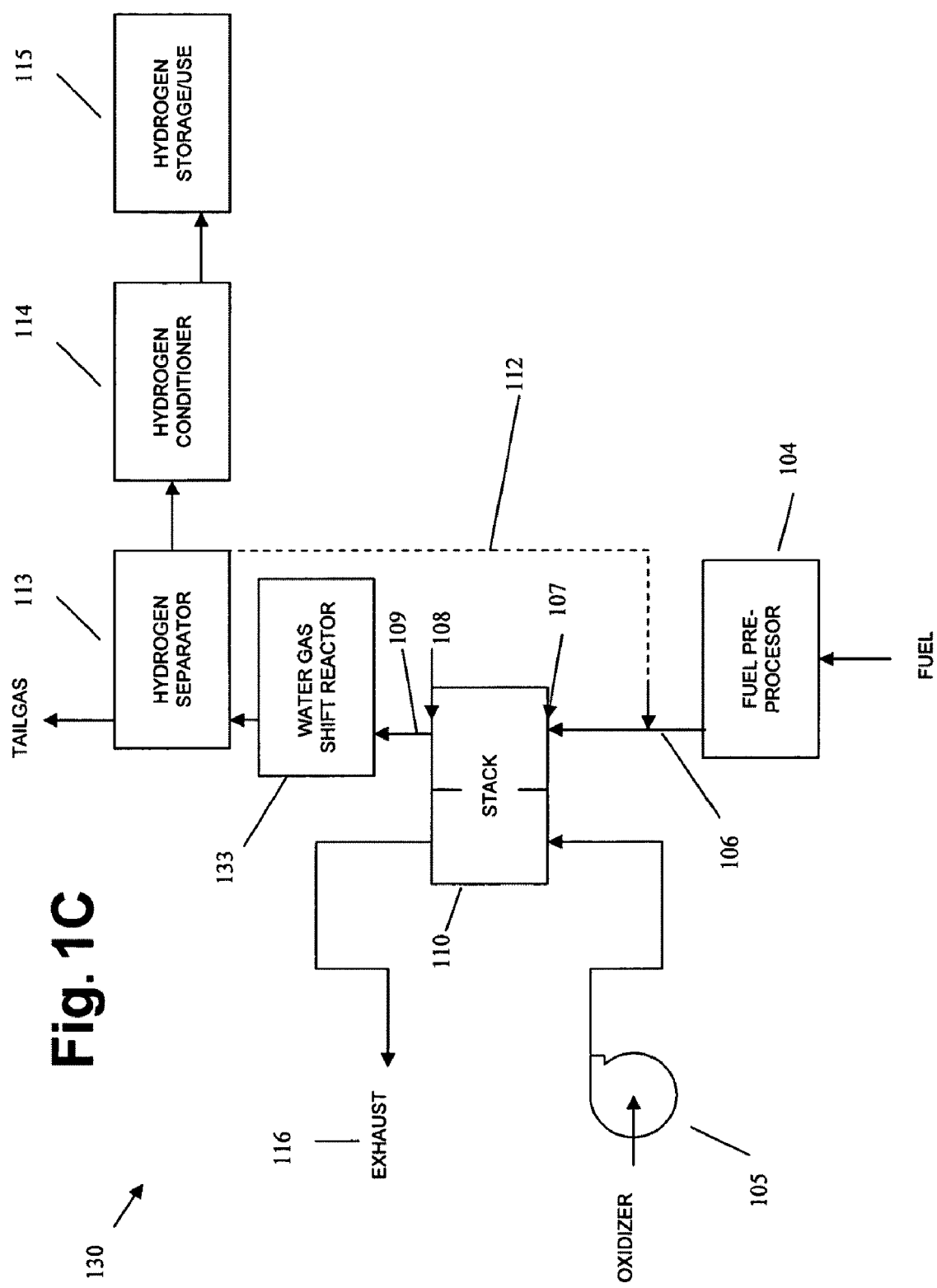

FIG. 1C illustrates a system 130 according to an alternative aspect of the first preferred embodiment. The system 130 is identical to the system 100 illustrated in FIG. 1A, except that the system 130 contains a water-gas shift reactor 133. The water-gas shift reactor 133 may be any suitable device which converts at least a portion of the water exiting the fuel cell stack 110 fuel outlet 108 into free hydrogen. For example, the reactor 133 may comprise a tube or conduit containing a catalyst which converts some or all of the carbon monoxide and water vapor in the tail gas exiting outlet 108 into carbon dioxide and hydrogen. The catalyst may be any suitable catalyst, such as a iron oxide or a chromium promoted iron oxide catalyst. The reactor 133 is preferably located between the outlet 108 and the hydrogen separator 113 (i.e., downstream of the outlet 108 and upstream of the separator 113).

The reactor 133 works in tandem with the separator 113 by increasing the amount of free hydrogen in the fuel side exhaust (i.e., tail gas) by converting some or all water present in the fuel side exhaust gas into hydrogen. The reactor 133 then provides hydrogen and carbon dioxide to the separator 113. The separator 113 separates the hydrogen from the carbon dioxide. Thus, all or some of the water present in the fuel may be converted to hydrogen in the reactor 133.

FIG. 1D illustrates a system 140 according to an alternative aspect of the first preferred embodiment. The system 140 is identical to the system 100 illustrated in FIG. 1A, except that the system 140 contains a water supply 144. The water supply 144 may be any suitable liquid water and/or water vapor supply device, such as a water conduit or storage tank. The water supply is located upstream of the fuel inlet 107 to provide water into the fuel inlet 107 in addition to the fuel being provided to the inlet from the preprocessing subsystem 104 or the reformer 124.

The water supply 144 is preferably, but not necessarily, used to provide water into the fuel inlet 107 when the fuel cell stack 110 is operated to generate hydrogen while generating little or no electricity in the fuel cell mode (i.e., no net electricity is produced in the fuel cell mode). The additional water is used to support fuel reforming as needed.

The elements of systems 100, 120, 130 and 140 may be used in any suitable combination. For example, the reformer 124, the reactor 133 and the water supply 144 may be used together in one system with or without the fuel preprocessing subsystem 104. Furthermore, any two or three elements selected from the fuel preprocessing subsystem 104, the reformer 124, the reactor 133 and the water supply 144 may be used together in the same system.

The systems 100, 120, 130 and 140 illustrated in FIGS. 1A-1D may have other embodiments and configurations, as desired. Other components, such as fuel side exhaust stream condensers, heat exchangers, heat-driven heat pumps, turbines, additional gas separation devices, may be added if desired, as described, for example, in U.S. application Ser. No. 10/300,021, filed on Nov. 20, 2002, to Matthias Gottmann, et al., incorporated herein by reference in its entirety.

A preferred method of operating the systems 100, 120, 130, 140 will now be described. The systems are preferably operated so that excess fuel is provided to the fuel cell stack 110. Any suitable carbon containing and hydrogen containing fuel is provided into the fuel cell stack. The fuel may comprise a fuel such as a hydrocarbon fuel, such as methane, natural gas which contains methane with hydrogen and other gases, propane or other biogas.

If desired, hydrogen and/or water vapor may be added to the hydrocarbon fuel. Alternatively, the fuel may comprise a mixture of a non-hydrocarbon carbon containing gas, such as carbon monoxide, carbon dioxide, oxygenated carbon containing gas such as methanol or other carbon containing gas with a hydrogen containing gas, such as water vapor or hydrogen gas, for example the mixture may comprise syngas derived from coal or natural gas reformation. The hydrogen and water vapor may be recycled from the fuel side exhaust gas stream or provided from hydrogen and water vapor conduits or storage vessels.

The reformation reactions occur within the fuel cell stack 110 and/or in the optional reformer 124 and result in the formation of free hydrogen in the fuel side exhaust gas stream. For example, if a hydrocarbon gas such as methane is used as a fuel, then the methane is reformed to form a mixture containing non-utilized hydrogen, carbon dioxide and water vapor in the fuel cell stack 110. If natural gas is used as a fuel, then the natural gas may be converted to methane in the preprocessing subsystem 104 or it may be reformed directly to a non-hydrocarbon carbon containing gas such as carbon monoxide in the reformer 124.

The following Table I summarizes one or more reactions that may occur within the fuel cell stack 110 when methane is supplied to the stack.

TABLE I

| | |
|---|---|
| Steam-methane reforming | $CH_4 + H_2O \rightarrow CO + 3H_2$ |
| Water-gas shift | $CO + H_2O \rightarrow CO_2 + H_2$ |
| CO oxidation | $CO + \frac{1}{2}O_2 \rightarrow CO_2$ |
| Hydrogen oxidation | $H_2 + \frac{1}{2}O_2 \rightarrow H_2O$ |
| Partial oxidation | $CH_4 + \frac{1}{2}O_2 \rightarrow CO + 2H_2$ |

If a mixture of a hydrogen containing gas and a non-hydrocarbon carbon containing gas, such as carbon monoxide, is used as a fuel, then some of the carbon monoxide is converted to carbon dioxide in the fuel cell stack 110 and a gas mixture including carbon monoxide, carbon dioxide and unutilized hydrogen is provided from the fuel cell stack 110. If the water-gas shift reactor 133 is included in the system, then it converts some of the carbon monoxide and water vapor in the fuel side exhaust gas stream to hydrogen and carbon dioxide.

Preferably, the fraction of hydrogen separated by the hydrogen separator 113 and the amount of total fuel provided to the fuel cell stack 110 for electricity and hydrogen production are variable and under the control of an operator operating a control unit of the system. An operator may be a human operator who controls the hydrogen separation and electricity production or a computer which automatically adjusts the amount of hydrogen separation and electricity production based on predetermined criteria, such as time, and/or based on received outside data or request, such as a demand for electricity by the power grid and/or a demand for hydrogen by the subsystem 115. Controlling these two parameters allows the operator to specify largely independently the amount of hydrogen produced and the amount of electricity generated. The outside data or request may comprise one or more of electricity demand, hydrogen demand, electricity price and hydrogen price, which may be transmitted electronically to a computer system operator or visually or audibly to a human system operator.

In one extreme, when the user of the system needs electricity, but does not need additional hydrogen, then the operator can choose to have the hydrogen containing streams recirculated back into the fuel cell stack 110 by the separator 113 through conduit 112 while providing no hydrogen or a minimum amount of hydrogen to the subsystem 115.

In another extreme, when the user of the system needs hydrogen, but does not need any electricity generated, the operator can choose to have the fuel cell stack 110 act primarily to internally reform the carbon containing fuel into hydrogen with minimal power generation and/or minimal or no external power output/delivery from the system. A small amount of power may be generated to keep the system at operating temperature and to power the hydrogen separator 113 and conditioner 114, if necessary, in addition to other parasitic loads in the system. All or most of the hydrogen from the separator 113 is provided to the subsystem 115 rather than to the conduit 112. In this case, additional water from the water supply 144 is preferably added to the fuel.

In the continuum between the two extremes, varying amounts of hydrogen and electricity may be needed simultaneously. In this case, the operator can choose to divert varying amounts of the hydrogen enriched stream from the separator 113 to conduit 112 and subsystem 115 while simultaneously generating the desired amount of electricity. For example, if more hydrogen is recirculated back into the fuel cell stack 110 through conduit 112, then more electricity is generated but less hydrogen is available for use or storage in the subsystem 115. The trade off between the amount of electricity and hydrogen produced can vary based on the demand and the price of each.

The trade off between the amount of electricity and hydrogen generated may also be achieved using several other methods. In one method, the amount of fuel provided to the fuel cell stack 110 is kept constant, but the amount of current drawn from the stack 110 is varied. If the amount of current drawn is decreased, then the amount of hydrogen provided to the hydrogen separator 113 is increased, and vice versa. When less current is drawn, less oxygen diffuses through the electrolyte of the fuel cell. Since the reactions which produce free hydrogen (i.e., the steam-methane reforming reaction (if methane is used as a fuel) and the water-gas shift reaction) are substantially independent of the electrochemical reaction, the decreased amount of diffused oxygen generally does not substantially decrease the amount of free hydrogen provided in the fuel side exhaust gas stream.

In an alternative method, the amount of current drawn from the stack is kept constant, but the amount of fuel provided to the stack 110 is varied. If the amount of fuel provided to the stack 110 is increased, then the amount of hydrogen provided to the hydrogen separator 113 is increased, and vice versa.

In another alternative method, both the amount of current drawn and the amount of fuel provided into the fuel cell stack 110 are varied. The amount of hydrogen generated generally increases with decreasing amounts of drawn current and with increasing amounts of fuel provided into the fuel cell stack. The amount of hydrogen generated generally decreases with increasing amounts of drawn current and with decreasing amounts of fuel provided into the fuel cell stack.

Preferably, the systems of the first preferred embodiment may be operated at any suitable fuel utilization rate. Thus, 0 to 100 percent of the fuel may be utilized for electricity production. Preferably, 50 to 80 percent of the fuel is utilized for electricity production and at least 10 percent, such as 20 to 50 percent, of the fuel is utilized for hydrogen production. For example, a 100 kWe SOFC system may be used to generate from about 70 to about 110 kWe of electricity and from about 45 to about 110 kg/day of high pressure hydrogen when 50 to 80 percent of the fuel is utilized for electricity production. The present inventors have determined that the systems of the first preferred embodiment may be used to produce hydrogen cost effectively. Thus, the method of the first preferred embodiment provides a reduction in the cost of hydrogen production.

If the fuel cell stack 110 is a solid oxide regenerative fuel cell (SORFC) stack which is connected to a primary source of power (such as a power grid) and a source of oxidized fuel (such as water, with or without carbon dioxide), then the device can operate transiently in an electrolysis mode as an electrolyzer to generate hydrogen streams, methane streams, or mixtures when economically advantageous (e.g., when the cost of electricity is inexpensive compared to the cost of the fuel containing bound hydrogen), or during times when the demand for hydrogen significantly exceeds the demand for electricity. At other times, the system 100 can be used in the fuel cell mode to generate electricity from the stored hydrogen or carbon containing fuel. Thus, the system 100 can be used for peak shaving.

The Second Preferred Embodiment

The present inventors have also realized that the electrochemical system produces valuable byproducts in addition to electricity and hydrogen. The byproducts can include production, consumption, and/or temporary storage of heat, methane, carbon dioxide, oxygen, and water. Carbon dioxide and/or other carbon containing gases emitted in a fuel side exhaust of a SORFC system of a second preferred embodiment operating in the fuel cell mode may be captured and stored rather than vented into the atmosphere. This improves the environmental friendliness of the SORFC system. The stored carbon dioxide and/or other carbon containing gases can then be provided into the SORFC system operating in the electrolysis mode to generate a hydrocarbon fuel, such as methane, rather than a hydrogen fuel. If desired, the SORFC system may contain a flow controller which controls a flow of carbon dioxide being provided into the solid oxide regenerative fuel cell fuel inlet during electrolysis mode. The flow controller may be any suitable gas flow control device, such as a computer or operator controlled valve which opens and closes access to a carbon dioxide and/or other carbon containing gas storage vessel, such as a carbon dioxide storage tank. The SORFC generates a hydrocarbon fuel, such as methane, by using a Sabatier subsystem, when carbon dioxide and water vapor are provided into the SORFC fuel inlet. The SORFC generates a hydrogen fuel when water vapor is provided into the SORFC fuel inlet and the flow controller prevents carbon dioxide flow into the SORFC fuel inlet.

Thus, the first and second preferred embodiments of the present invention enable a user to choose between multiple options for procuring electricity, heat, and fuels (hydrogen, hydrocarbons, or mixtures) using a high temperature electrochemical system. For example, a hydrocarbon fuel, such as natural gas or methane, can be used to generate a continuously variable amount of electricity and hydrogen rich streams when either or both electricity and hydrogen are needed or it is economically desirable to do so. In a preferred aspect of the present invention, a fuel, such as methane or hydrogen, or fuel mixtures can be produced from electricity and water, with or without carbon dioxide, when such fuels are needed or when desirable to do so for economic reasons and/or for carbon sequestration. In another preferred aspect of the present invention, energy or electricity may be stored efficiently in the form of hydrocarbon fuel, hydrogen, or fuel mixtures during times when electricity is relatively inexpensive compared with the cost of procuring the hydrocarbon fuel, hydrogen or fuel mixtures in order to effect peak shaving or enable the use of such stored electricity when the primary source of electricity is relatively expensive or unavailable.

A general block diagram of the inputs and outputs in an SORFC system 200 of the second preferred embodiment is shown in FIG. 2. The inputs into the SORFC stack 210 include two or more of the following: electricity, heat, hydrocarbon fuel or fuel mixtures, hydrogen fuel or fuel mixtures, air, oxygen, carbon dioxide, and water. The outputs include two or more of the following: electricity, heat, hydrocarbon fuel or fuel mixtures, hydrogen fuel or fuel mixtures, oxygen, carbon dioxide, water, and exhaust.

The SORFC system 200 is capable of electrolyzing water or water and carbon dioxide mixtures with the addition of electricity and heat. The SORFC system 200 generates hydrogen in an electrolysis mode when it electrolyzes water and generates a hydrocarbon fuel, such as methane, when it electrolyzes a water/carbon dioxide mixture. The SORFC system 200 is capable of performing fuel cell reactions (i.e., operate in the electricity generating fuel cell mode) using any suitable fuel, such as hydrogen fuel, a carbon containing fuel, such as a hydrocarbon fuel, such as methane, propane or natural gas, and mixtures of hydrogen, hydrogen containing, carbon containing, and/or hydrocarbon fuels, and any suitable oxidizer, such as air, purified oxygen or mixtures thereof. In fuel cell mode, reformation reactions within the fuel stack result in the formation of free hydrogen as discussed above.

Thus, the system 200 can be operated to perform one or more of the following functions. The system 200 can produce hydrogen and oxygen from electricity, heat, and water in the electrolysis mode. The system 200 can produce methane and oxygen from carbon dioxide, water, and electricity in the electrolysis mode. The system 200 can produce hydrogen from a carbon and hydrogen containing fuel in a fuel cell mode, as described with respect to the first embodiment. The system 200 can generate any one or more of electricity, heat, water and carbon dioxide from a carbon containing fuel, hydrogen, or fuel mixtures and oxygen or air in the fuel cell mode. The system 200 also enables real-time arbitrage between buying and selling electricity from different sources (e.g., grid power vs. fuel cell generation using hydrocarbon fuel, hydrogen, or fuel mixtures that are purchased or previously generated and stored for later use).

The SORFC system 200 has many different uses. For example, the system 200 may be connected to a primary source of power for purchasing power when desirable and/or for selling power back to the grid when desirable. Operating decisions can be made by a human operator and/or can be under computer operator control in order to make decisions based on time-dependent economic factors. One time dependent economic factor is a time variable cost of electricity to the operator or charged by the operator which depends on time of day, day of the week, season, local weather, etc. Another time dependent economic factor is the cost of natural gas or other hydrocarbon fuel charged to the operator which depends on season, local weather, or other time dependent factors. A third time dependent economic factor is a user's time dependent needs for hydrogen to be used as a commodity, such as for a transportation fuel, in addition to its utility for energy storage.

The net electrolysis reaction is $xCO_2+2(x+y)H_2O=xCH_4+2yH_2+(2x+y)O_2$, where x and y are continuously variable by the operator, and can equal zero. The net fuel cell reaction is: $XCH_4+2YH_2+(2X+Y)O_2=XCO_2+2(X+Y)H_2O$, where X and Y are continuously variable by the operator. By varying the amount of carbon dioxide in the electrolysis mode, the system 200 may be used to generate the desired amount of hydrogen, methane and mixtures thereof, based on the demand for and/or the price of hydrogen and methane. Thus, a human or a computer operator may vary the carbon dioxide to water ratio provided into the SORFC stack 210 in the electrolysis mode to obtain a desired amount of methane and/or hydrogen. If no carbon dioxide or other carbon bearing gasses are provided into the SORFC stack 210, then the stack 210 generates pure hydrogen. If mostly carbon dioxide or other carbon bearing gas along with a small amount of water are provided into the SORFC stack 210 in the electrolysis mode, then the system generates mostly methane. The hydrogen and/or methane generated in the electrolysis mode may be separated from each other by a hydrogen separator and stored for future use when the system 200 operates in the fuel cell mode or may be put to other uses outside the system 200, such as for use in transportation (i.e., to power a vehicle if the system 200 is located in a vehicle), power generation, heating or in chemical reactions (i.e., to be used in hydrogenation).

Thus, it is advantageous to store carbon dioxide and other carbon containing gases, such as unused fuel present in the tail gas, produced by the system 200 in the fuel cell mode rather than venting these gases into the air. First, storing carbon containing gases reduces environmental pollution. Second, the stored carbon containing gases, such as carbon dioxide can be fed back into the SORFC stack 210 in the electrolysis mode when it is desired to generate and store methane.

The systems 100, 120, 130, 140, 200 of the preferred embodiment are advantageous because they can be used to simultaneously generate both electrical power and hydrogen in the fuel cell mode. An example is an apartment or office complex, whose tenants will use electrical power within their residences or offices and hydrogen to fuel their vehicles. Another example may be a manufacturing plant that requires electrical power for operations and hydrogen for processing, cooling, or for transportation of goods. Additionally, the systems 100, 120, 130, 140, 200 of the preferred embodiments are advantageous because they allow the real-time economic trade between production of hydrogen streams via electrolysis of water using grid power, and the production of hydrogen streams and electricity by operating the fuel cell stack in the fuel cell mode with internal reforming of the fuel containing bound hydrogen.

FIGS. 3-7 illustrate the preferred components of the systems 100, 120, 130, 140 and 200 of the first and second preferred embodiments. While a SORFC system is described with respect to FIGS. 3-7, it should be noted that a SOFC system may also be used instead, except that the SOFC system does not operate in the electrolysis mode.

A single SORFC 10 operating in the electrolysis mode is shown in FIG. 3. The SORFC contains an anode electrode, an electrolyte and a cathode electrode. Anode electrode 11 is preferably a porous electrode comprising perovskites, metals and/or cermets. Preferably, the anode electrode comprises a perovskite material. Cathode electrode 12 is also preferably a porous electrode comprising platinum or platinum family metals. Preferably, the cathode electrode comprises platinum. Solid oxide electrolyte 13 is sheet of ceramic material, such as yttria stabilized zirconia. Electrodes 11 and 12 are attached to electrolyte 13. An anode gas chamber 14 is formed between the electrolyte 13 and an anode side interconnect (not shown for simplicity). A cathode gas chamber 15 is formed between the electrolyte 13 and a cathode side interconnect (also not shown for simplicity).

A gas mixture 17 containing primarily water vapor and optionally carbon dioxide is introduced into the cathode gas chamber 15. A direct current power source (not shown) is connected to the anode electrode 11 and the cathode electrode 12 in such a way that when electrical current is flowing, the anode electrode 11 takes on a positive voltage charge and the cathode electrode 12 takes on a negative voltage charge. When the electric current is flowing, the gas mixture 17 containing primarily water vapor and carbon dioxide gives up oxygen ions 16 to form cathode discharge mixture 19 consisting primarily of hydrogen and carbon monoxide. Oxygen ions 16 transport across the electrolyte 13 under the electrical current. The oxygen ions 16 are converted into oxygen gas 18 on the anode electrode 11 under the influence of the electrical current. The oxygen gas 18 is discharged from the anode chamber 14.

Figure 4:
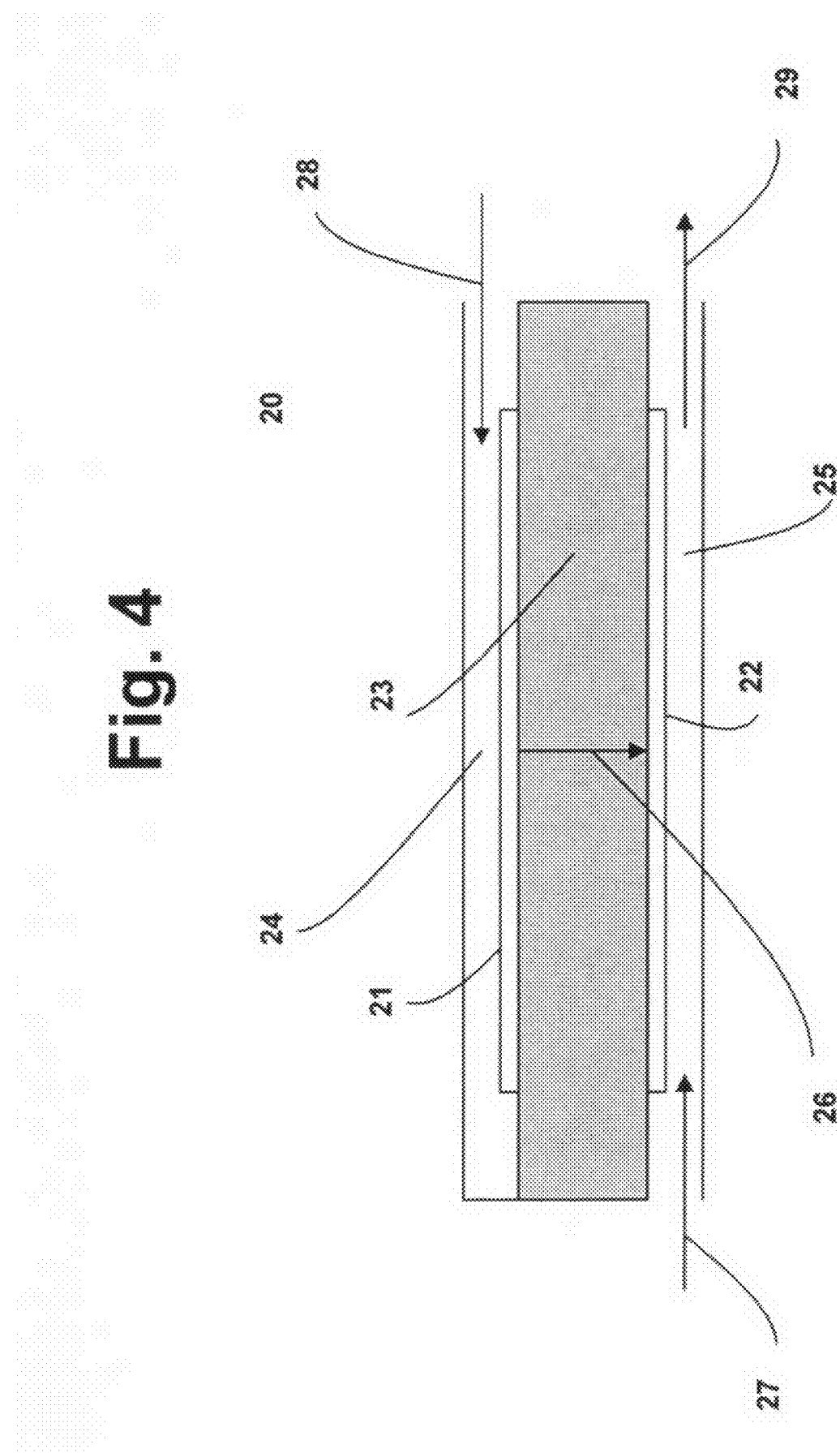
FIG. 4 is a schematic cross section of a single SORFC operating in the fuel cell mode according to a preferred embodiment of the present invention.

A single SORFC 20 operating in the fuel cell mode is shown in FIG. 4. SORFC 20 is the same as SORFC 10, except that the cathode and anode designations of its electrodes are reversed. Cathode electrode 21 is the same electrode as that identified as the anode electrode 11 in FIG. 3 when operating in the electrolysis mode. Anode electrode 22 is the same electrode as that identified as the cathode electrode 12 in FIG. 3 when operating in the electrolysis mode. Solid oxide electrolyte 23 is the same electrolyte as that identified as electrolyte 13 in FIG. 3 when operating in the electrolysis mode. Cathode gas chamber 24 is the same gas chamber as that identified as the anode gas chamber 14 in FIG. 3 when operating in the electrolysis mode. Anode gas chamber 25 is the same gas chamber as that identified as the cathode gas chamber 15 in FIG. 3 when operating in the electrolysis mode.

A gas mixture 27 containing water vapor and methane is introduced into the anode gas chamber 25. Oxygen gas 28 is introduced into the cathode chamber 24. An electrical fuel cell load (not shown) is applied to the SORFC 20 and the oxygen gas 28 forms oxygen ions 26 under the influence of the electrical load. Oxygen ions 26 transport across the electrolyte 23 under the influence of the electrical current. On the anode electrode 22, the oxygen ions 26 combine with carbon and hydrogen from gas mixture 27 to form gas mixture 29 containing carbon dioxide, water vapor and hydrogen. Gas mixture 29 is discharged from the anode chamber. In the process described above, the SORFC 20 has made electrical energy or power, which is output through its electrodes.

Figure 5:
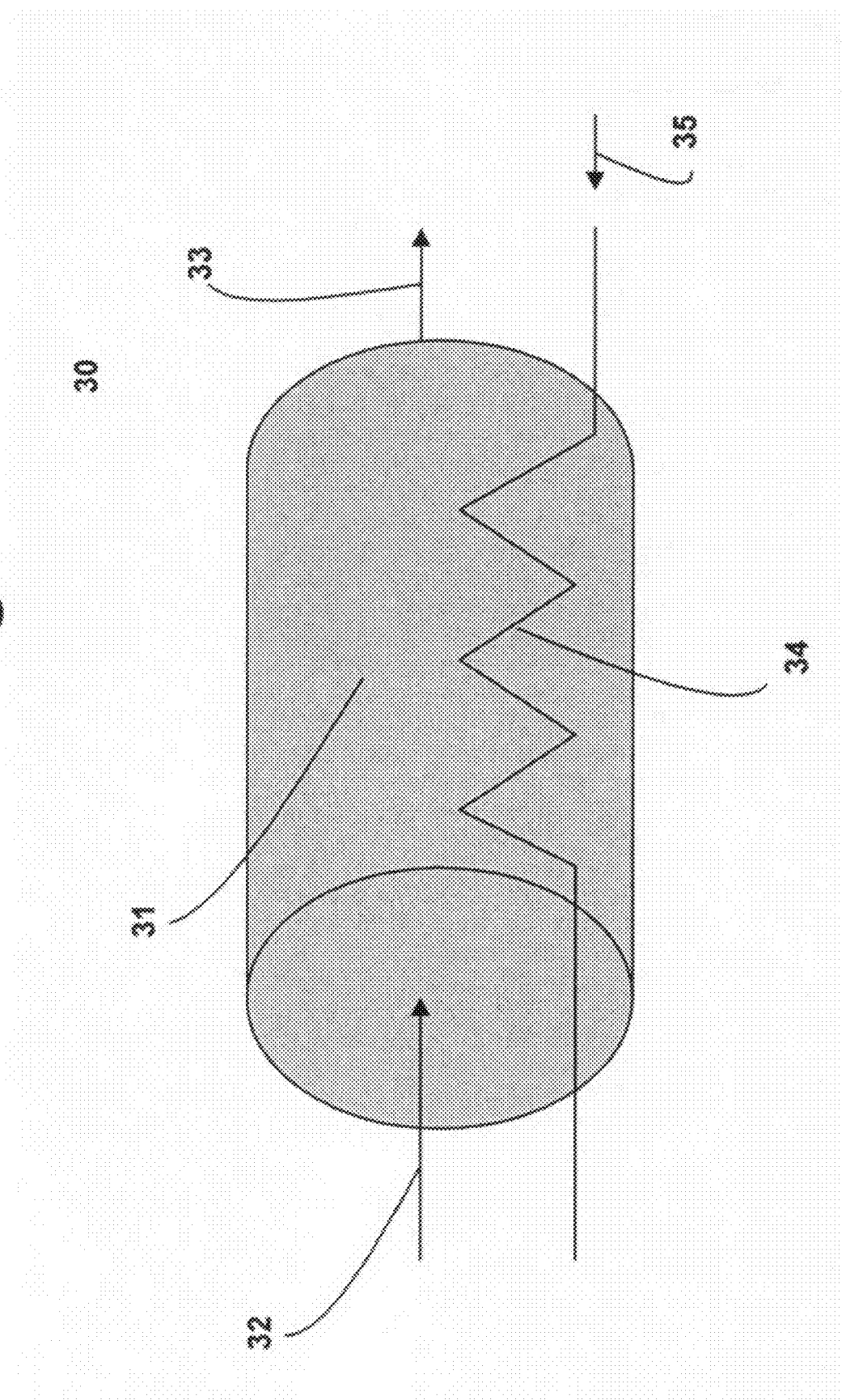
FIG. 5 is a schematic side of view of a Sabatier reactor according to a preferred embodiment of the present invention.

A Sabatier reactor subsystem 30 is shown in FIG. 5. The reactor tube 31 contains a catalyst, such as a platinum family metal on an alumina support. Preferably, the catalyst comprises ruthenium. A gas mixture 32 consisting primarily of hydrogen and carbon monoxide is introduced into reactor tube 31 and contacts the catalyst therein. The gas mixture 32 undergoes an immediate exothermic reaction and produces gas mixture 33 consisting primarily of methane and water vapor. Gas mixture 33 is then discharged from the reactor tube 31. When the Sabatier reactor is used with the SORFC 10 operating in the electrolysis mode, the hydrogen and carbon monoxide discharge mixture 19/32 is provided from the SORFC into the Sabatier reactor 30.

Because the reaction within reactor tube 31 is highly exothermic, a heat exchanger 34 is used to capture the generated heat. Gas mixture 35, consisting primarily of carbon dioxide and water, flows through heat exchanger 34 to absorb the exothermic reaction heat. When the Sabatier reactor is used with the SORFC 10 operating in the electrolysis mode, the water vapor and carbon dioxide inlet mixture 17/35 is heated in the Sabatier reactor by the reaction of the outlet or discharge mixture 19/32. The water vapor and carbon dioxide inlet mixture 17/35 is then provided from the Sabatier reactor into the SORFC 10.

The SORFC systems 50A, 50B of preferred embodiments operating in a fuel cell mode are shown in FIGS. 6A and 6B as simplified schematics. A single SORFC 20 previously shown in FIG. 4 as a cross section operating in the fuel cell mode is shown again in FIGS. 6A and 6B. While a single SORFC is shown, it should be understood that the systems 50A, 50B contains a plurality of SORFC stacks.

The system 50A contains one hydrogen separator 113 as shown in FIG. 6A. The system 50B contains two hydrogen separators 113A, 113B, as shown in FIG. 6B. A valve 111A, 111B, such as a three way valve, or another similar device, may be used to control the amount of hydrogen provided into conduit 112 and into subsystem 115. If desired, the valve 111A, 111B and conduit 112 are omitted and all hydrogen recovered by the hydrogen separator is provided into subsystem 115.

An enthalpy recovery unit 52 transfers water vapor from a first gas stream to a second gas stream. The enthalpy recovery unit 52 can be a device which transfers water vapor based on cyclic desiccant beds or a rotating desiccant wheel. The desiccant wheel (i.e., "enthalpy wheel") is preferred. Purge valve 53 is a normally closed powered open solenoid valve. A heat exchanger 54 is a counter flow gas-gas heat exchanger. The SORFC power output, such as output electrode(s), is connected to a power distribution system. The oxidizer (i.e., oxygen or air) enters the systems 50A, 50B through the oxidizer inlet or conduit 55, while the fuel enters the systems through the fuel inlet or conduit arrangement 56/57. The fuel side exhaust exits through conduit arrangement 58/59.

One preferred method of operating the system 50A in the fuel cell mode is now described. Within the SORFC system 50A shown in FIG. 6A, pure oxygen reactant gas is delivered from an oxygen storage vessel, such as a liquid oxygen tank, to the cathode chamber of SORFC 20 through inlet conduit 55. The oxygen reactant, being highly pure, is normally dead headed within the cathode chamber of SORFC 20. However, even the purest of gases will include trace non reactant gas species. As a result the cathode chamber of SORFC 20 must be occasionally purged of these non reactant species. Oxygen purge valve 53 is used to accomplish this purging.

A fuel inlet stream, such as a carbon containing gas stream, preferably a hydrocarbon gas stream, is introduced into the SORFC system 50A from a fuel storage vessel, such as a tank (not shown for clarity), through conduit 56. Preferably, the fuel inlet stream is a methane stream. The hydrogen separator 113 preferably transfers hydrogen gas from the fuel side exhaust outlet stream in conduit 58 into the fuel inlet stream in conduit 56 through conduit 112. The recirculated hydrogen supports a uniform methane reformation process within the anode chamber of SORFC 20. The methane and hydrogen mixture next is introduced into the enthalpy recovery unit 52, where a portion of the water vapor is transferred from the fuel side exhaust outlet stream in conduit 58 into the methane and hydrogen inlet stream. Preferably, the enthalpy recovery unit also transfers heat from the outlet stream to the inlet stream. From the enthalpy recovery unit 52, the methane, hydrogen and water vapor mixture is introduced into the heat exchanger 54, where the gas mixture temperature is increased near to the operational temperature of 600 C to 1000 C using the high temperature waste heat from the outlet stream in conduit 58. From heat exchanger 54, the hot mixture of methane, hydrogen, and water vapor is delivered to the anode chamber of SORFC 20 through conduit 57. Some steam reformation of the methane will occur in the heat exchanger 54 and conduit 57 but the amount is suppressed by the existence of the hydrogen. The completion of the steam reforming of the methane is accomplished in the anode chamber of the SORFC 20.

Within the anode chamber of the SORFC 20, the steam reforming of methane and the oxidation of carbon and hydrogen in the fuel cell reactions converts the discharged gas mixture (i.e., fuel side exhaust) in conduit 58 to carbon dioxide, additional water vapor, and excess hydrogen. The discharged gas mixture in conduit 58 passes through heat exchanger 54, releasing waste heat, and then through the enthalpy recovery unit 52 to supply a portion of the water vapor to support the input methane reformation. The discharged gas mixture in conduit 58 is then directed to the hydrogen separator 113. The hydrogen separator 113 separates hydrogen from the gas mixture. An optional valve 111A, such as a three way valve or a similar device, separates the recovered hydrogen flowing from separator 113 into two streams. The first hydrogen stream is directed back into the fuel inlet stream in conduit 56 through conduit 112. The other hydrogen stream is directed to the subsystem 115 through the optional hydrogen conditioner 114. By varying the valve 111A position, the amount of hydrogen provided into each of the two streams may be varied, or one of the streams may be shut off as desired. The outlet or tail gas mixture in conduit 59 from the hydrogen separator 113 contains only carbon dioxide and water which are stored separately (not shown).

An alternative preferred method uses two hydrogen separators 113A and 113B of the system 50B, as shown in FIG. 6B. The discharged gas mixture in conduit 58 from the enthalpy recovery unit 52 is directed to the valve 111B. The valve 111B separates the gas mixture into two streams or portions. The first stream or portion is provided to the first hydrogen separator 113A. The first hydrogen separator 113A separates the hydrogen from the discharged fuel side exhaust stream and provides the separated hydrogen though conduit 112 back into conduit 56. The second stream or portion is provided to the second hydrogen separator 113B. The hydrogen separator 113B separates the hydrogen from the discharged fuel side exhaust stream and provides the separated hydrogen though optional conditioner 114 into subsystem 115. By varying the valve 111B position, the amount of hydrogen provided into conduit 112 and subsystem 115 may be varied or hydrogen may be provided only into one of the conduit 112 and subsystem 115, as desired. The outlet or tail gas mixture in conduit 59 from the hydrogen separators 113A, 113B contains only carbon dioxide and water which are stored separately (not shown). Other aspects of the method of using system 50B are the same as in the method of using system 50A, and are not repeated.

The SORFC system 60 of a preferred embodiment operating in an electrolysis mode is shown in FIG. 7 as a simplified schematic. A single SORFC 10 previously shown in FIG. 3 as a cross section operating in the electrolysis mode is shown again in FIG. 7.

The Sabatier reactor subsystem 30, described with respect to FIG. 5, converts carbon monoxide and hydrogen into methane and water vapor. The heat exchanger 54 is a counter flow gas-gas heat exchanger. Carbon dioxide and water enter the system 60 through inlet or conduit 61, which may be the same or different than conduit 56, shown in FIG. 6A. The generated oxygen exits through outlet or conduit 65, while the methane and water exit through outlet or conduit arrangement 63/64. Conduits 63/64 and 65, respectively, may be the same or different conduits as conduits 58/59 and 55, respectively, shown in FIG. 6A.

Thus, the system 60 operating in the electrolysis mode is the same system as system 50 operating in the fuel cell mode, except that the inlet and outlet streams are steered through the Sabatier reactor subsystem 30 instead of through the enthalpy recovery unit 52, which remains inactive in the electrolysis mode. The inlet and outlet streams may be steered using valves and parallel conduits (not shown for clarity). Furthermore, the electrode designations in the SORFC 10 of system 60 are reversed compared to SORFC 20 of system 50, as explained in detail with respect to FIGS. 3 and 4 above.

A method of operating the system 60 in the electrolysis mode is now described. Carbon dioxide and water are introduced into the SORFC system 60 through conduit 61 from water source 71 (such as a water pipe or water storage vessel) and carbon dioxide 73 storage vessel. A valve 75 controls the amount of carbon dioxide provided into conduit 61. Alternatively, a three way valve may be used in conduit 61 to control the relative amounts of water and carbon dioxide flowing through the conduit. If the valve 75 is closed, then no carbon dioxide is provided into the conduit 61, and the system 60 produces a hydrogen fuel. In this case, the exhaust from the fuel cell stack 10 may be diverted around the Sabatier subsystem 30 by using bypass valves and conduits (not shown for clarity). If the valve 75 is open, the system 60 produces a hydrocarbon fuel.

Within the hydrogen separator 113, hydrogen gas is transferred from the outlet stream in conduit 63 into the carbon dioxide and water inlet stream in conduit 61. This extra hydrogen eventually assures that all the carbon bearing gases are converted into methane within the Sabatier reactor subsystem 30. The carbon dioxide, water, and hydrogen inlet mixture next is introduced into the Sabatier subsystem 30 heat exchanger where it is heated by the exothermic reaction. From the Sabatier subsystem 30, the carbon dioxide, hydrogen and water vapor mixture is introduced into the heat exchanger 54, where the gas mixture temperature is increased further to near to the operational temperature of 600 C to 1000 C using the high temperature waste heat from the outlet stream in conduit 63. From heat exchanger 54, the hot mixture of carbon dioxide, hydrogen, and water vapor is delivered to the cathode chamber of SORFC 10 through conduit 62. Within the cathode chamber of SORFC 10, the carbon dioxide and water vapor are reduced by electrolysis to carbon monoxide and hydrogen. Excess water and some unreacted carbon dioxide will be discharged from the cathode chamber of SORFC 10 along with the carbon monoxide and hydrogen through conduit 63.

The discharged gas mixture in conduit 63 passes through heat exchanger 54 releasing waste heat to the inlet stream and then through the Sabatier subsystem 30 to convert all the carbon oxides to methane and water with the excess hydrogen. The discharged gas mixture in conduit 63 is then directed to the hydrogen separator 113 which can separate and transfer hydrogen to the inlet carbon dioxide and water stream and/or forward hydrogen to the hydrogen storage/use subsystem 115. The outlet mixture in conduit 64 from hydrogen separator 113 preferably contains only methane and water which are stored separately (not shown).

In the meantime, pure oxygen gas is generated in the SORFC 10 anode during the electrolysis process. The oxygen is discharged from the SORFC 10 anode through conduit 65. The oxygen can be discharged into the air, provided for direct metabolic use and/or provided for liquefied storage in a storage vessel (not shown). Preferably, the fuel cell systems described above have an active fuel cell system design and operate under a forced gas stream flow regime, rather than passive system design operating under an equilibrium/diffusion gas stream flow regime. However, passive systems may also be used, if desired.

Third Preferred Embodiment

While the preferred embodiments described above have been described as using a hydrocarbon and/or hydrogen fuel, other non-hydrocarbon carbon containing fuels may be used instead. For example, carbon monoxide, or other carbon bearing gases may be used as fuel for a solid oxide fuel cell. These non-hydrocarbon carbon containing fuel gases may optionally be mixed with hydrogen, water vapor, hydrocarbon gases and/or other gases. Thus, in another preferred embodiment of the present invention, a non-hydrocarbon carbon containing fuel is used to operate the solid oxide fuel cell. The non-hydrocarbon carbon containing fuel may be used to operate the fuel cell with or without additional hydrocarbon and hydrogen containing gases, such as methane, natural gas, hydrogen and water vapor. In this embodiment, the fuel cell may be used with or without the hydrogen separator 113 and subsystem 115 described in the previous embodiments. The non-hydrocarbon carbon containing fuel preferably comprises at least 50 volume % of the fuel provided into the fuel cell, more preferably at least 75%, more preferably at least 95%, up to 100% of the fuel.

The non-hydrocarbon carbon containing fuel may be obtained from several different sources. For example, the fuel may be provided into the SOFC or SORFC from a carbon monoxide storage vessel or conduit. Alternatively, the fuel may be provided from a coal source. One way to use a coal source is to gasify coal and to provide this gas into the fuel cell. Another way is to provide coal and carbon dioxide into a fluidized bed reactor to obtain carbon monoxide and to provide the carbon monoxide into the fuel cell. Another way is to gasify and partially oxidize coal with oxygen to obtain carbon monoxide and water vapor, then to provide a water gas shift reaction using a catalyst bed, such as a Ni catalyst bed to provide a carbon dioxide and hydrogen fuel mixture, all or part of which is provided into the fuel cell (i.e., the hydrogen may be separated). Another way is to react coal with water vapor at high temperature to generate carbon monoxide and hydrogen gas and to provide all or part of this gas mixture into the fuel cell (i.e., the hydrogen may be separated). The hydrogen in the fuel mixtures described above may be separated by a hydrogen separator before the fuel is provided into the fuel cell or from the fuel side exhaust exiting the fuel cell. The separated hydrogen may be provided into the subsystem 115 and/or recirculated into conduit 112.

In one preferred aspect, the non-hydrocarbon carbon containing fuel excludes a reformed non-hydrocarbon carbon containing fuel, such as syngas, which was reformed in a reformer located in the electrochemical system from a hydrocarbon fuel, such as natural gas. In another preferred aspect, the non-hydrocarbon carbon containing fuel includes a reformed non-hydrocarbon carbon containing fuel, such as syngas, which was reformed in a reformer located in the electrochemical system from a hydrocarbon fuel, such as natural gas.

For example, clean coal particulate is reacted with carbon dioxide in a fluidized bed to produce carbon monoxide. This carbon monoxide is reacted within a solid oxide fuel cell to produce electricity and carbon dioxide.

Figure 8:
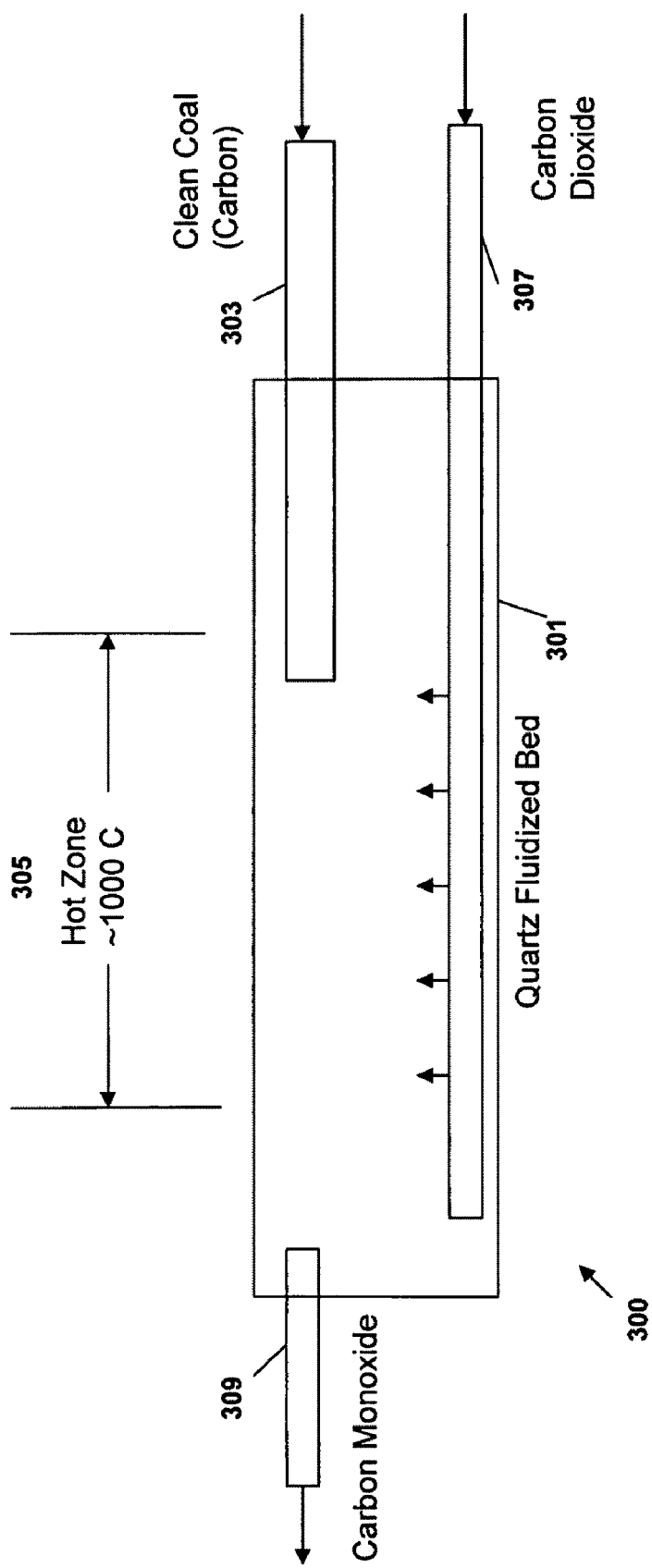
FIGS. 8 and 9 are schematics of a system of an alternative embodiment of the present invention.

FIG. 8 provides a view of the fluidized bed reactor 300. The reactor includes a large quartz tube 301 or other reactor enclosure which can tolerate the high temperature reaction without itself entering into the reaction. Such a reactor can be used to react carbon and carbon dioxide into carbon monoxide at approximately 1000° C. For example, the clean coal particulate is fed into the reactor 300 by a mechanical worm screw feed or other suitable feeder 303. The solid fuel is maintained at a level approximately one half of the reactor volume. Nickel catalyst particles are initially seeded within the reactor to encourage the reaction. As the solid carbon is converted to carbon monoxide the nickel catalyst is left behind in the reactor to support the conversion of additional coal. The carbon dioxide is fed into the hot zone 305 of the reactor through an inlet 307, such as a small quartz tube. Heat is applied to the reactor to bring the reactor to approximately 1000° C. The product carbon monoxide is then delivered from the reactor 300 through an outlet conduit 309 to the fuel cell.

Figure 9:
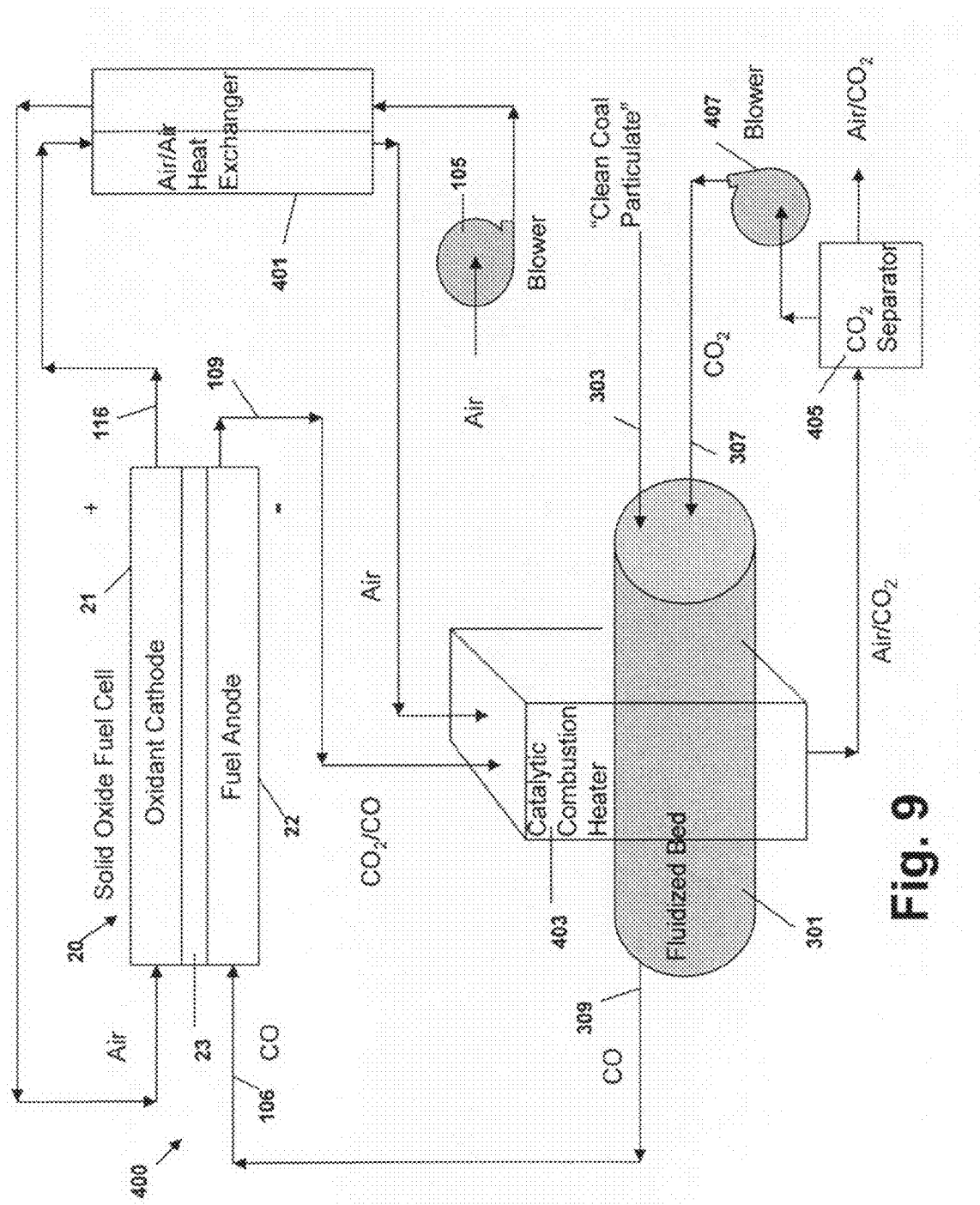

FIG. 9 shows the coal reactor 300 integrated into the entire solid oxide fuel cell system 400. In the system 400, the hot carbon monoxide from the reactor 300 is fed directly into the solid oxide fuel cell 20 anode 22. At the same time, air is forced from blower 105 through an air/air heat exchanger 401 to obtain an appropriate temperature for introduction into the solid oxide fuel cell 21 cathode. Within the solid oxide fuel cell, oxygen ions pass through the solid oxide electrolyte 23 from the airside to the fuel side and react with the carbon monoxide to produce electricity and carbon dioxide. From a practical viewpoint, it is not possible to react all the carbon monoxide within the solid oxide fuel cell. This does not create a problem because heat energy is needed in the fluidized coal reactor bed to produce the carbon monoxide. The fuel anode exhaust gas is reacted with excess air from exchanger 401 in the catalyst combustion heater 403 that surrounds the fluidized bed reactor 300. All of the carbon monoxide is consumed in producing the required heat and only depleted air and carbon dioxide mixture is discharged from the heater 403. Before discharging this mixture to ambient, some of the carbon dioxide is preferably separated from the mixture by a carbon dioxide separator 405. If desired, the separated carbon dioxide can be blown back into the fluidized bed reactor 300 as the second reactant. An adsorption/absorption based separator 405 is used to separate the carbon dioxide from the other gases.

Alternatively, the separated carbon dioxide may be stored in vessel 73 to be later used with a SORFC in an electrolysis mode. Furthermore, if desired, the hydrogen separator 113 and other system components illustrated in FIGS. 1A, 1B, 1C, 1D, 6A, 6B, and 7 may be located between the fuel cell 20 and the heater 403. Thus, the tail gas containing CO and $CO_2$ provided from the separator 113 outlet conduit 59 may be provided into the heater 403.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. It is intended that the scope of the invention be defined by the claims appended hereto, and their equivalents.

What is claimed is:

1. A method of producing hydrogen, comprising:
providing a carbon containing fuel and an oxidizer into a high temperature fuel cell;
generating a fuel side exhaust stream from the fuel cell while the fuel and the oxidizer are provided into the fuel cell operating in a fuel cell mode;
providing the fuel side exhaust stream to a hydrogen separator;
separating in the hydrogen separator at least a portion of hydrogen from a stream consisting of the fuel side exhaust stream during the fuel cell mode;
providing at least a first portion of the separated hydrogen from the hydrogen separator to a hydrogen storage vessel or to a hydrogen using device;
recycling at least a second portion of the separated hydrogen the hydrogen separator to the fuel cell; and
providing a remainder of the fuel side exhaust stream from the hydrogen separator as tail gas, and wherein the step of separating in the hydrogen separator at least the portion of hydrogen occurs prior to recycling a portion of the fuel side exhaust stream toward the fuel cell.

2. The method of claim 1, further comprising generating electricity during the step of separating at least a portion of hydrogen.

3. The method of claim 2, wherein the high temperature fuel cell comprises a molten carbonate fuel cell.

4. The method of claim 2, wherein the high temperature fuel cell comprises a solid oxide fuel cell.

5. The method of claim 1, wherein the high temperature fuel cell comprises a solid oxide fuel cell.

6. The method of claim 1, further comprising conditioning the separated hydrogen and providing the conditioned hydrogen to the hydrogen storage vessel or to the hydrogen using device.

7. The method of claim 2, further comprising controlling a variable amount of separated hydrogen based on predetermined criteria or based on received data.

8. The method of claim 7, further comprising controlling a variable ratio of an amount of electricity generated to an amount of separated hydrogen.

9. The method of claim 8, wherein 20 to 50% of the fuel provided into the fuel cell is utilized for hydrogen production.

10. The method of claim 7, wherein the ratio is controlled by varying at least one of an amount of current drawn from the fuel cell and the amount of fuel being provided into the fuel cell.

11. The method of claim 1, wherein the separated hydrogen is provided to a hydrogen storage vessel.

12. The method of claim 1, wherein the separated hydrogen is provided to a hydrogen using device.

13. The method of claim 12, wherein the hydrogen using device comprises a second fuel cell.

14. The method of claim 1, further comprising recirculating a portion of the separated hydrogen into a fuel inlet gas stream.

15. The method of claim 14, further comprising using a first hydrogen separator to recirculate a portion of the separated hydrogen into a fuel inlet gas stream and using a second hydrogen separator to provide the separated hydrogen to the hydrogen storage vessel or to the hydrogen using device.

16. The method of claim 1, wherein the solid oxide fuel cell is a solid oxide regenerative fuel cell which acts as a power generator and a hydrocarbon fuel reformer in the fuel cell mode.

17. The method of claim 16, further comprising:
providing carbon dioxide from the solid oxide regenerative fuel cell into a carbon dioxide storage vessel when the solid oxide regenerative fuel cell operates in a fuel cell mode;
providing the carbon dioxide from the carbon dioxide storage vessel and water from a water source into the solid oxide regenerative fuel cell and providing carbon monoxide and hydrogen from the solid oxide regenerative fuel cell into a Sabatier subsystem when the solid oxide regenerative fuel cell operates in an electrolysis mode;
generating methane and water vapor in the Sabatier subsystem from the received carbon monoxide and hydrogen; and
providing the methane into a methane storage vessel.

18. The method of claim 1, wherein the fuel comprises a methane or a natural gas fuel.

19. The method of claim 1, wherein the fuel comprises at least 50% non-hydrocarbon carbon containing fuel.

20. The method of claim 1, further comprising converting a natural gas fuel into a methane fuel and providing the methane fuel into the fuel cell.

21. The method of claim 1, further comprising reforming a carbon and bound hydrogen containing fuel to a carbon containing and free hydrogen containing fuel and providing the carbon containing and free hydrogen containing fuel into the fuel cell.

22. The method of claim 1, further comprising converting at least a portion of water in the fuel side exhaust stream to hydrogen and providing at least a portion of the converted hydrogen to the hydrogen storage vessel or to the hydrogen using device.

23. The method of claim 1, further comprising providing water together with the fuel into a fuel inlet of the fuel cell.

24. A method of producing hydrogen, comprising:
providing a carbon containing fuel and an oxidizer into a solid oxide fuel cell;
generating electricity and a fuel side exhaust stream from the fuel cell while the fuel and the oxidizer are provided into the fuel cell;
providing the fuel side exhaust stream to a hydrogen separator;
separating in the hydrogen separator at least a portion of hydrogen from a stream consisting of the fuel side exhaust stream during generation of electricity;
providing at least a first portion of the separated hydrogen from the hydrogen separator to a hydrogen storage vessel or to a hydrogen using device;
recycling at least a second portion of the separated hydrogen from the hydrogen separator to the fuel cell; and
providing a remainder of the fuel side exhaust stream from the hydrogen separator as tail gas, and wherein the step of separating in the hydrogen separator at least the portion of hydrogen occurs prior to recycling a portion of the fuel side exhaust stream toward the fuel cell.

25. The method of claim 24, further comprising controlling a variable ratio of an amount of electricity generated to an amount of separated hydrogen based on predetermined criteria or based on received data.

26. The method of claim 24, wherein the separated hydrogen is provided to a hydrogen storage vessel.

27. The method of claim 24, wherein the separated hydrogen is provided to a hydrogen using device.

28. The method of claim 24, further comprising recirculating a portion of the separated hydrogen into a fuel inlet gas stream.

29. The method of claim 24, wherein the step of providing a carbon containing fuel comprises providing a hydrocarbon fuel into the fuel cell and reforming the hydrocarbon fuel in the fuel cell.

30. The method of claim 24, wherein the step of providing a carbon containing fuel comprises:
providing a hydrocarbon fuel into a reformer which is thermally integrated with the fuel cell;
reforming the hydrocarbon fuel in the reformer; and
introducing the reformed fuel into the fuel cell.

* * * * *